(12) United States Patent
Abe

(10) Patent No.: US 11,009,677 B2
(45) Date of Patent: May 18, 2021

(54) ZOOM LENS, IMAGE PICKUP APPARATUS INCLUDING ZOOM LENS, AND IMAGE PICKUP SYSTEM

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/247,898

(22) Filed: Jan. 15, 2019

(65) Prior Publication Data
US 2019/0227263 A1 Jul. 25, 2019

(30) Foreign Application Priority Data
Jan. 25, 2018 (JP) .............................. JP2018-010458

(51) Int. Cl.
| | |
|---|---|
| *G02B 9/60* | (2006.01) |
| *G02B 7/04* | (2021.01) |
| *G02B 13/06* | (2006.01) |
| *H04N 5/225* | (2006.01) |

(52) U.S. Cl.
CPC ................. *G02B 9/60* (2013.01); *G02B 7/04* (2013.01); *G02B 13/06* (2013.01); *H04N 5/2253* (2013.01); *H04N 5/2254* (2013.01)

(58) Field of Classification Search
CPC .......... G02B 9/60; G02B 9/34; G02B 15/173; G02B 15/20; G02B 15/22; G02B 15/163; G02B 15/14; G02B 15/177; G02B 7/04; G02B 27/64; G02B 27/646; G02B 13/06; G02B 13/18; G02B 13/04; G02B 13/24; G02B 13/0045; H04N 5/225; H04N 5/2254; H04N 5/2253; G03B 5/02; G03B 13/34; G03B 2205/0015; G03B 2205/0046
USPC ....... 359/763, 557, 684, 657–660, 686, 693, 359/695, 713, 714, 750–757, 764, 772, 359/773, 766
See application file for complete search history.

(56) References Cited

U.S. PATENT DOCUMENTS

2006/0279850 A1* 12/2006 Horiuchi .............. G02B 15/173
359/676
2012/0105708 A1* 5/2012 Hagiwara .............. G02B 15/24
348/345

FOREIGN PATENT DOCUMENTS

JP 2006337745 A 12/2006
JP 2012113285 A 6/2012

* cited by examiner

*Primary Examiner* — Jie Lei
(74) *Attorney, Agent, or Firm* — Carter, Deluca & Farrell LLP

(57) ABSTRACT

A zoom lens including, in order from an object side: a first positive lens unit; a second negative lens unit; a third positive lens unit; a fourth negative lens unit; and a fifth positive lens unit, wherein during zooming from a wide angle end, intervals between the adjacent lens units are changed in such a way that the second lens unit is configured to move from the object side to the image side and the third lens unit and the fourth lens unit are configured to move, and a focal length of the third lens unit, a focal length of the fourth lens unit, a movement amount of the second lens unit during zooming from the wide angle end to the telephoto end, and a movement amount of the third lens unit during zooming from the wide angle end to the telephoto end are appropriately set.

20 Claims, 15 Drawing Sheets

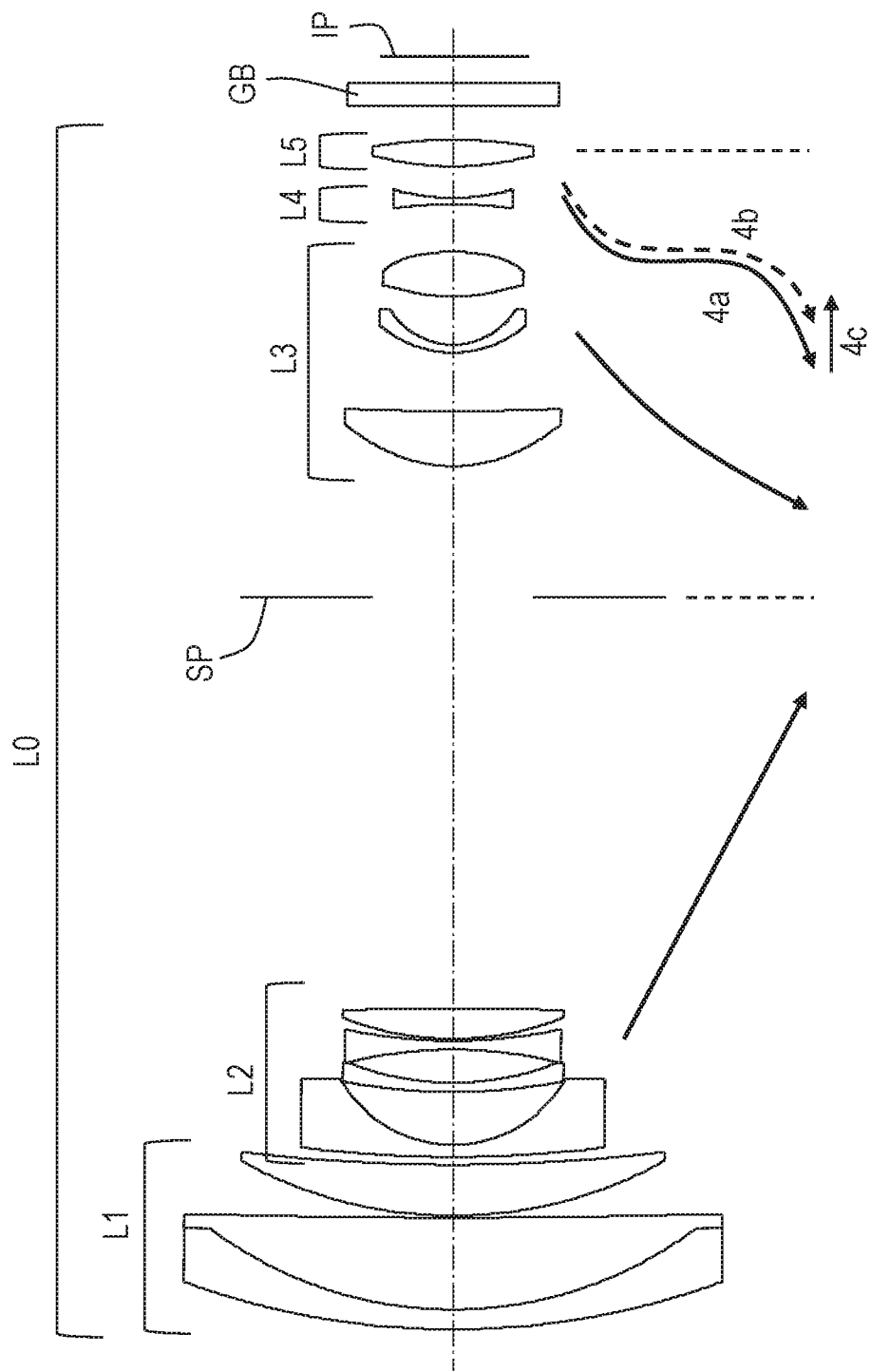

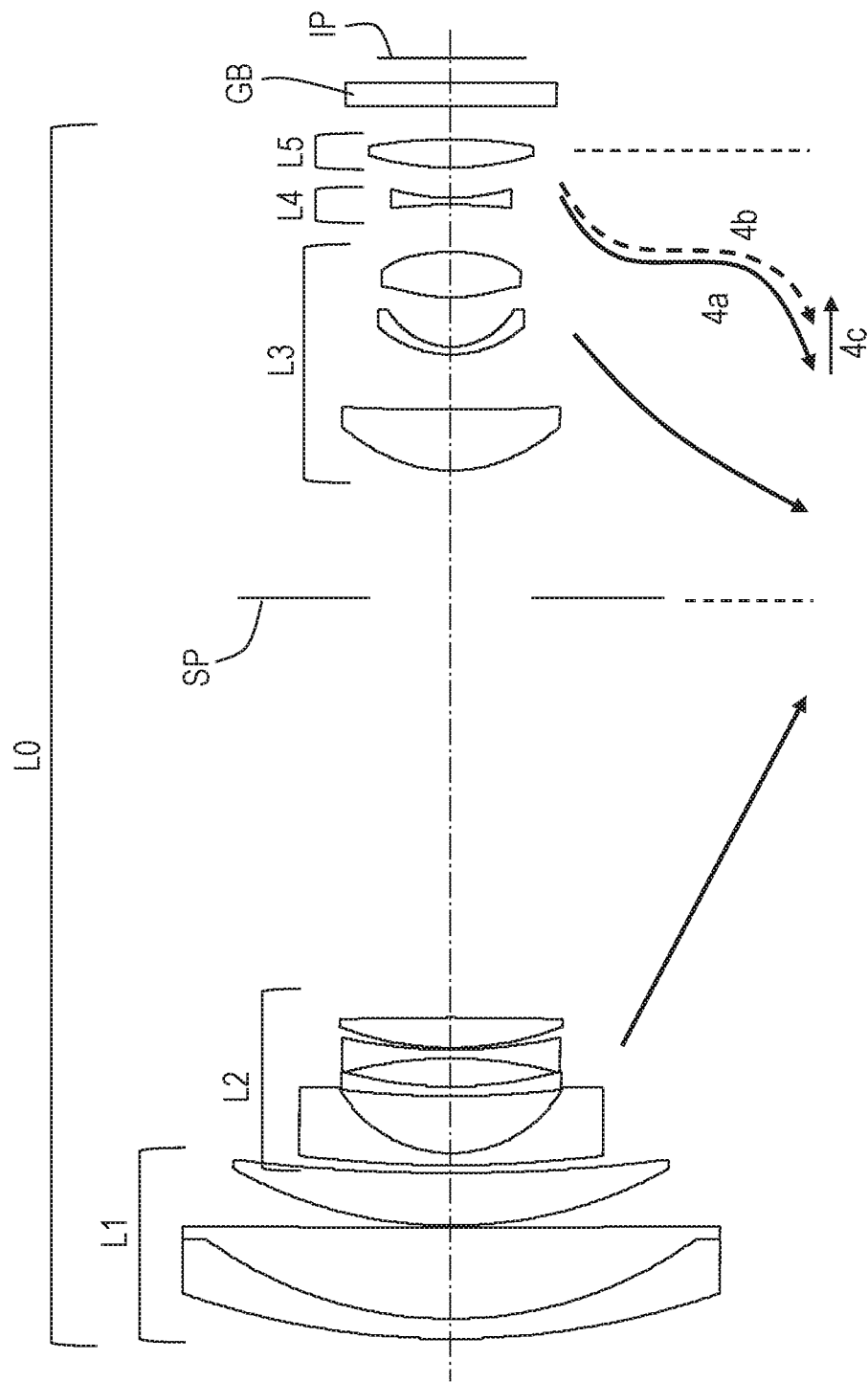

ZOOM LENS, IMAGE PICKUP APPARATUS INCLUDING ZOOM LENS, AND IMAGE PICKUP SYSTEM

BACKGROUND OF THE INVENTION

Field of the Invention

The present invention relates to a zoom lens and an image pickup apparatus including the zoom lens, and the present invention is particularly favorable as an image pickup optical system used in an image pickup apparatus such as a digital still camera, video camera, monitoring camera, and broadcast camera.

Description of the Related Art

Recently, a zoom lens as an image pickup optical system used in an image pickup apparatus has been required to be a compact zoom lens with a high zoom ratio.

As a zoom lens that satisfies the requirements, a positive lead type zoom lens has been known which includes a first lens unit having a positive refractive power, a second lens unit having a negative refractive power, and a rear unit consisting of one or more lens units, which are arranged in the order from an object side to an image side.

Japanese Patent Application Laid-open Nos. 2006-337745 and 2012-113285 each disclose a zoom lens consisting of a first lens unit having a positive refractive power, a second lens unit having a negative refractive power, a third lens unit having a positive refractive power, a fourth lens unit having a negative refractive power, and a fifth lens unit having a positive refractive power, which are arranged in the order from the object side to the image side.

The zoom lens disclosed in Japanese Patent Application Laid-open Nos. 2006-337745 and 2012-113285 is comparatively easily made to be a compact zoom lens with a high zoom ratio. In order to obtain a zoom lens being compact in total size with the high zoom ratio and achieving a high optical performance in the entire zoom range, it is important to appropriately set a zoom type, refractive powers of the lens units, movement loci of the lens units during zooming, and so on.

Particularly for a five-unit zoom lens with the abovementioned zoom type, it is important to appropriately set the refractive power of the third lens unit, the refractive power of the fourth lens unit, movement loci and movement amounts of the second lens unit and the third lens unit during zooming, and so on. Unless these configurations are appropriately set, it is difficult to obtain a compact zoom lens with a high zoom ratio.

In addition, it is important to appropriately set the refractive powers of the lens units with respect to the entire zoom lens magnification ratios of the lens units arranged on the image side of an aperture stop, the movement loci and the movement amounts during zooming, and the like.

An object of the present invention is to provide a compact zoom lens having a high zoom ratio and achieving a high optical performance in the entire zoom range, and image pickup apparatus including the zoom lens.

SUMMARY OF THE INVENTION

According to an aspect of the present invention, a zoom lens including, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power, wherein during zooming from a wide angle end to a telephoto end, intervals between the adjacent lens units are changed in such a way that the second lens unit is configured to move from the object side to the image side and the third lens unit and the fourth lens unit are configured to move, and the following conditional expressions are satisfied:

$-1.52 \le f3/f4 \le -1.25$; and $3.0 \le |M2/M3| \le 6.0$, where f3 represents a focal length of the third lens unit, f4 represents a focal length of the fourth lens unit, M2 represents a movement amount of the second lens unit during zooming from the wide angle end to the telephoto end, and M3 represents a movement amount of the third lens unit during zooming from the wide angle end to the telephoto end.

Further features of the present invention will become apparent from the following description of exemplary embodiments with reference to the attached drawings.

BRIEF DESCRIPTION OF THE DRAWINGS

FIG. 1 is a cross-sectional view of a zoom lens of Embodiment 1 at a wide angle end.

FIG. 3 is a cross-sectional view of a zoom lens of Embodiment 2 at the wide angle end.

DESCRIPTION OF THE EMBODIMENTS

Hereinafter, a zoom lens according to an embodiment of the present invention and image pickup apparatus including the zoom lens are described. The zoom lens according to the embodiment of the present invention includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power, which are arranged in the order from an object side to an image side.

During zooming, the first lens unit L1 and the fifth lens unit L5 do not move, but the second lens unit L2, the third lens unit L3, and the fourth lens unit L4 move. During zooming, intervals between the adjacent lens units are then changed.

FIGS. 1, 3, 5, 7, 9, 11, and 13 are cross-sectional views of zoom lenses of Embodiments 1 to 7 of the present invention at a wide angle end (shortest focal length).

Figure 2A:
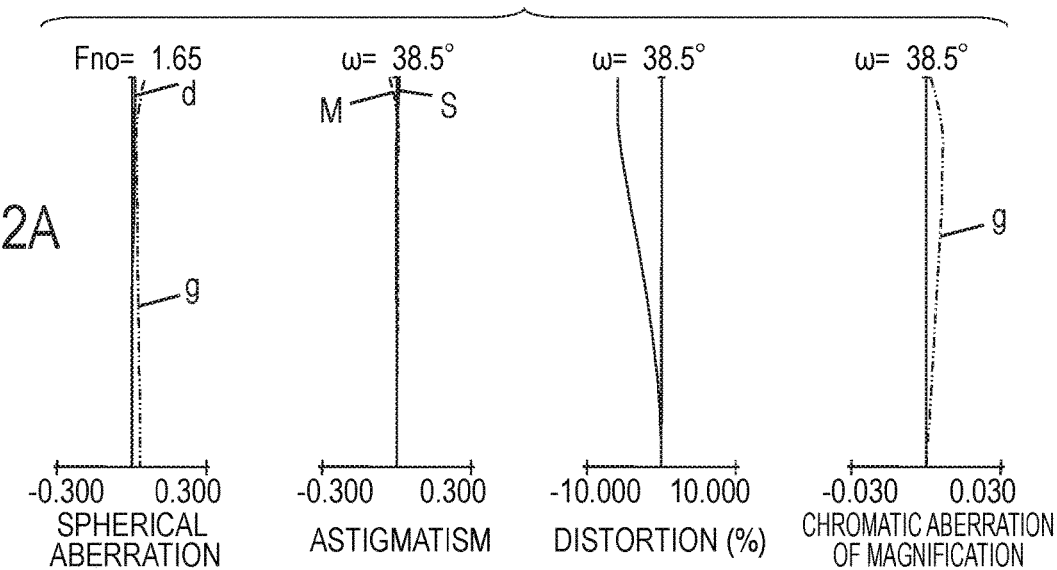
FIG. 2A is an aberration diagram of the zoom lens of Embodiment 1 at the wide angle end.
Figure 2B:
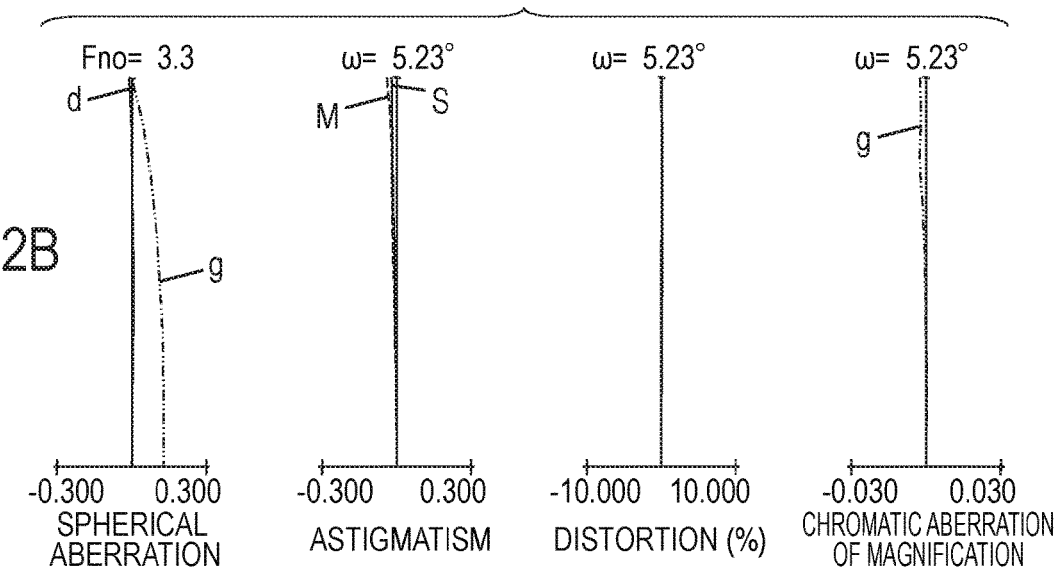
FIG. 2B is an aberration diagram of the zoom lens of Embodiment 1 at an intermediate zoom position.
Figure 2C:
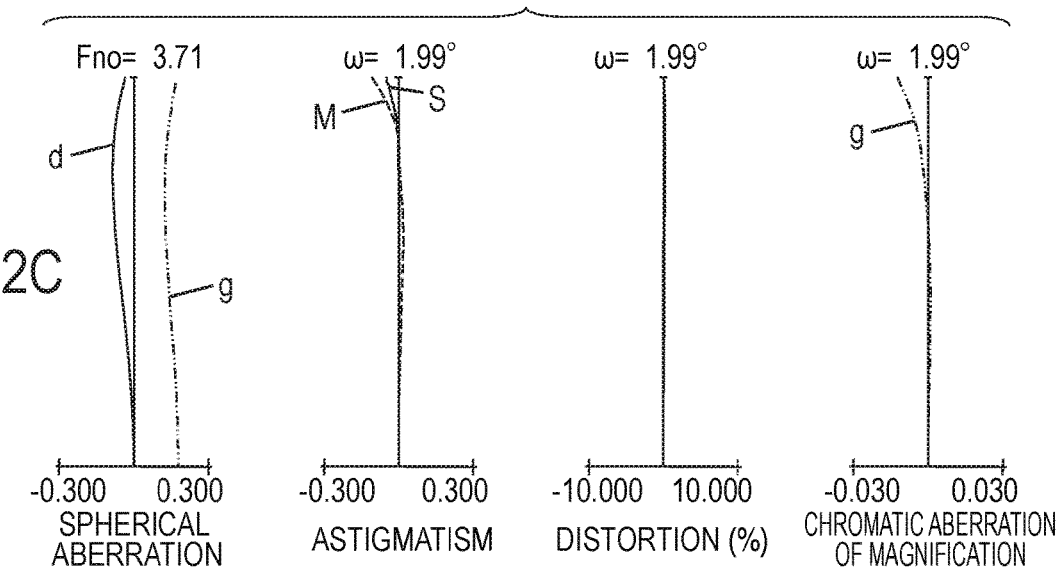
FIG. 2C is an aberration diagram of the zoom lens of Embodiment 1 at a telephoto end.

FIGS. 2A, 2B, and 2C are aberration diagrams respectively illustrating the zoom lens of Embodiment 1 at the wide angle end, an intermediate zoom position, and a telephoto end (longest focal length).

Figure 4A:
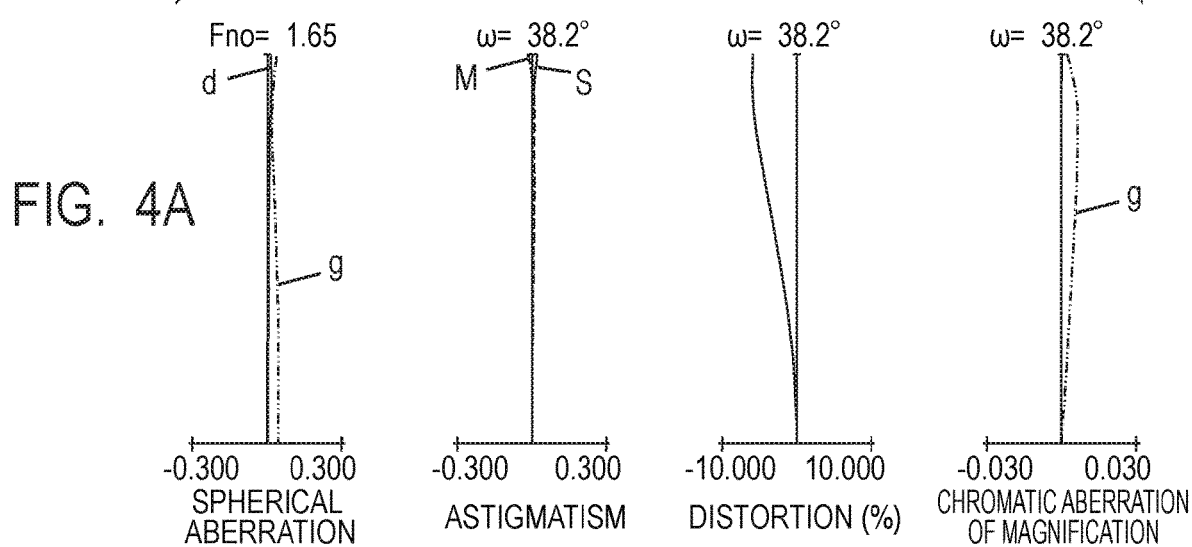
FIG. 4A is an aberration diagram of the zoom lens of Embodiment 2 at the wide angle end.
Figure 4B:
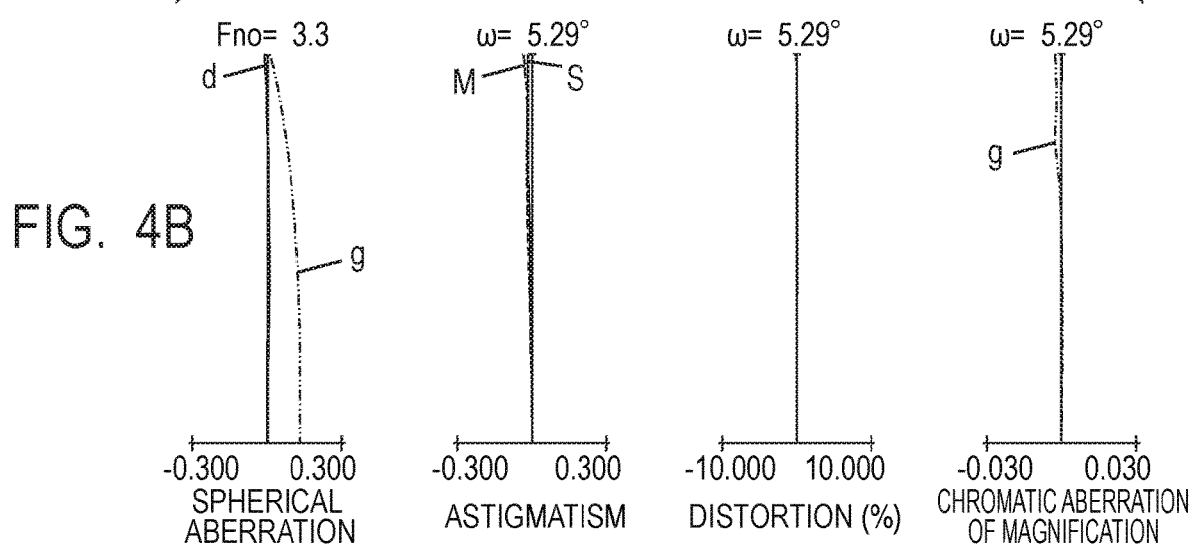
FIG. 4B is an aberration diagram of the zoom lens of Embodiment 2 at the intermediate zoom position.
Figure 4C:
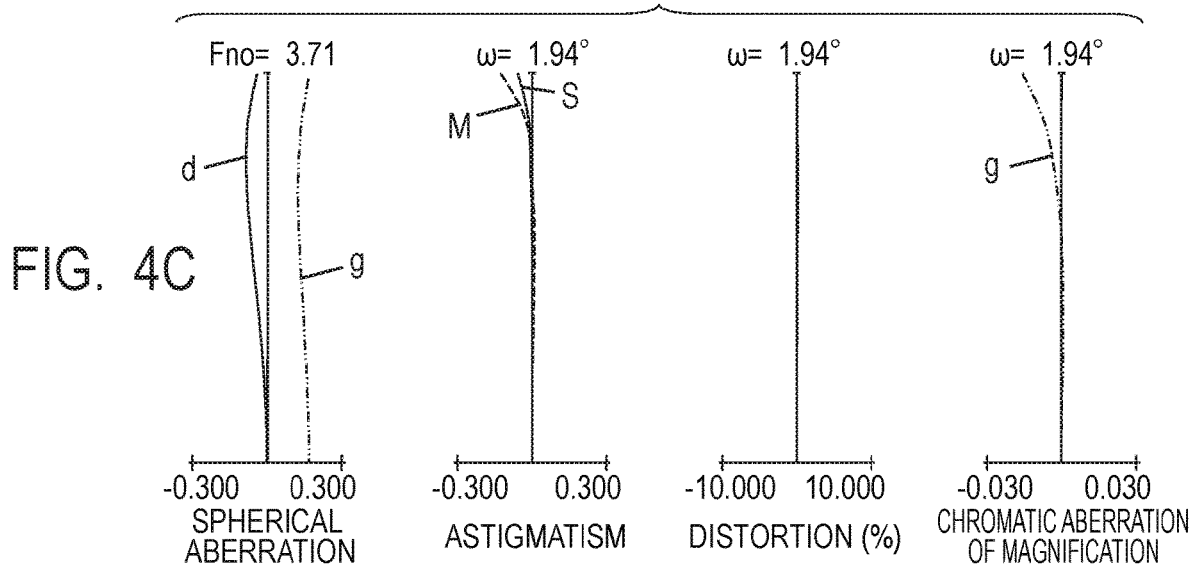
FIG. 4C is an aberration diagram of the zoom lens of Embodiment 2 at the telephoto end.
Figure 5:
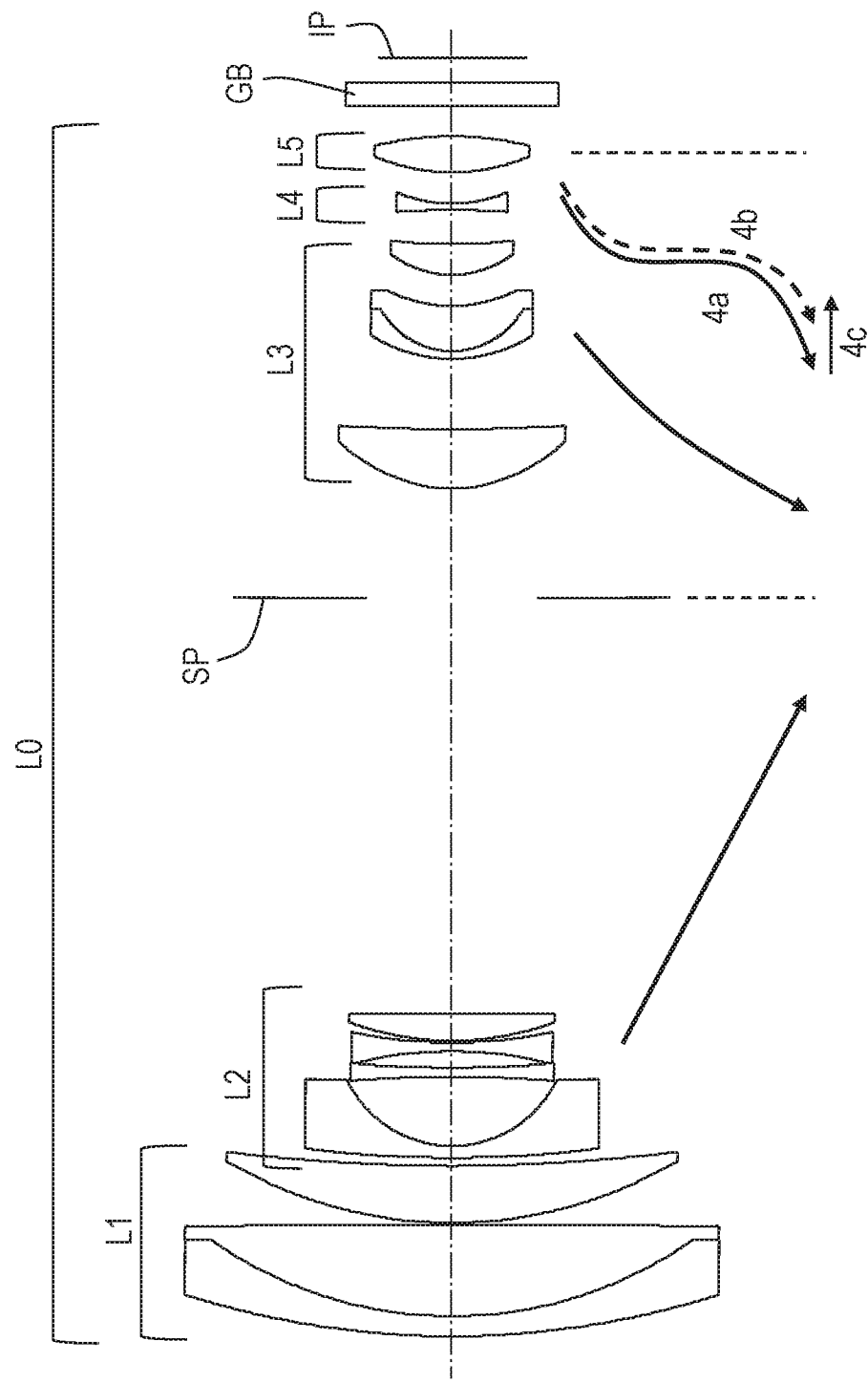
FIG. 5 is a cross-sectional view of a zoom lens of Embodiment 3 at the wide angle end.

FIGS. 4A, 4B, and 4C are aberration diagrams respectively illustrating the zoom lens of Embodiment 2 at the wide angle end, the intermediate zoom position, and the telephoto end (longest focal length).

Figure 6A:
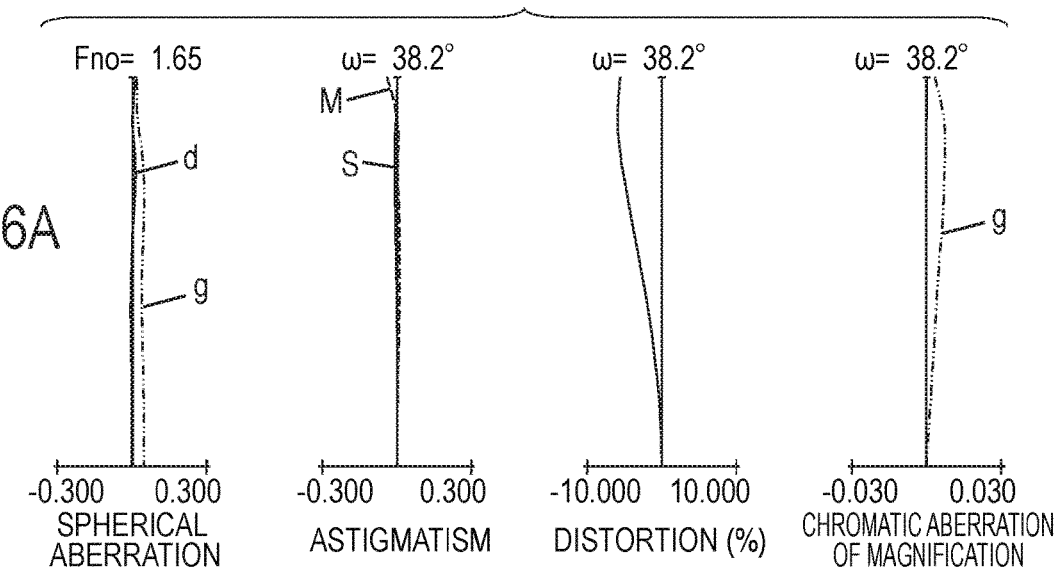
FIG. 6A is an aberration diagram of the zoom lens of Embodiment 3 at the wide angle end.
Figure 6B:
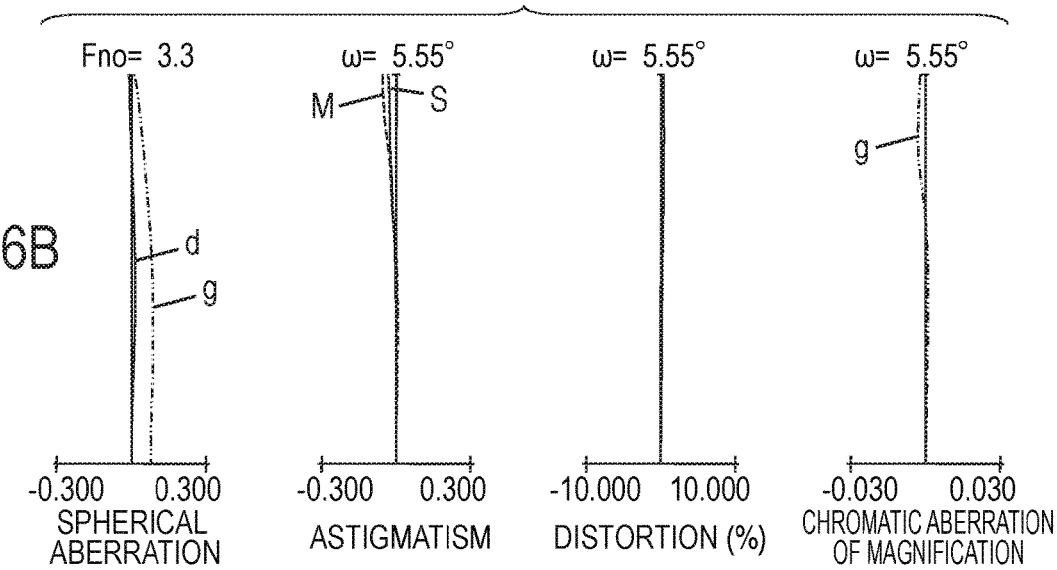
FIG. 6B is an aberration diagram of the zoom lens of Embodiment 3 at the intermediate zoom position.
Figure 6C:
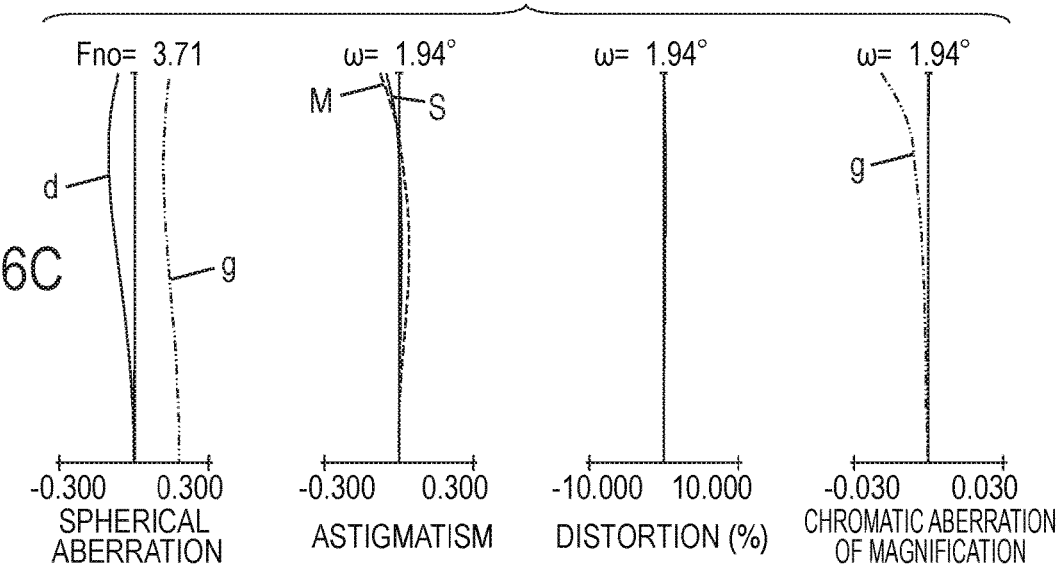
FIG. 6C is an aberration diagram of the zoom lens of Embodiment 3 at the telephoto end.
Figure 7:
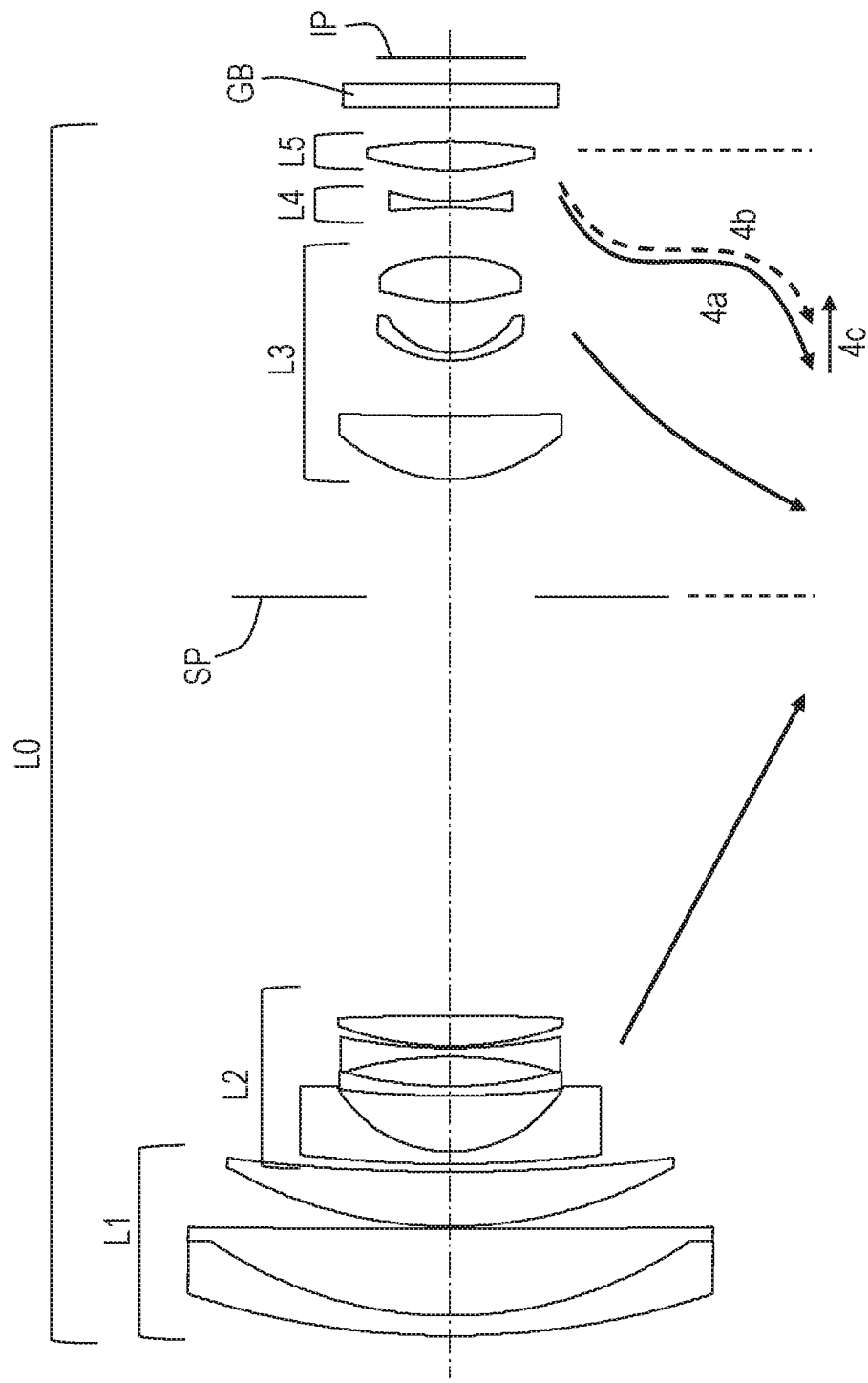
FIG. 7 is a cross-sectional view of a zoom lens of Embodiment 4 at the wide angle end.

FIGS. 6A, 6B, and 6C are aberration diagrams respectively illustrating the zoom lens of Embodiment 3 at the wide angle end, the intermediate zoom position, and the telephoto end (longest focal length).

Figure 8A:
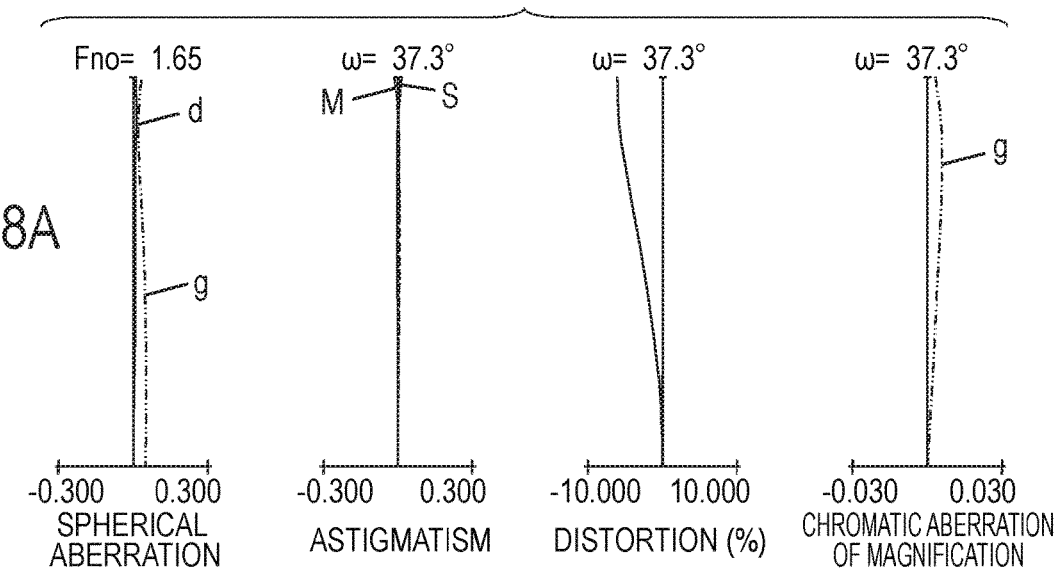
FIG. 8A is an aberration diagram of the zoom lens of Embodiment 4 at the wide angle end.
Figure 8B:
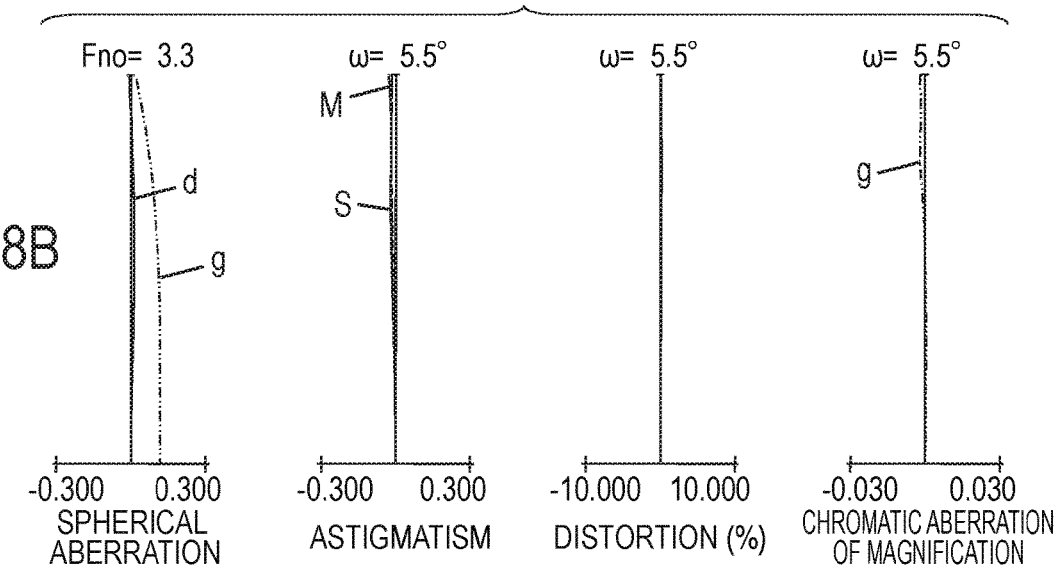
FIG. 8B is an aberration diagram of the zoom lens of Embodiment 4 at the intermediate zoom position.
Figure 8C:
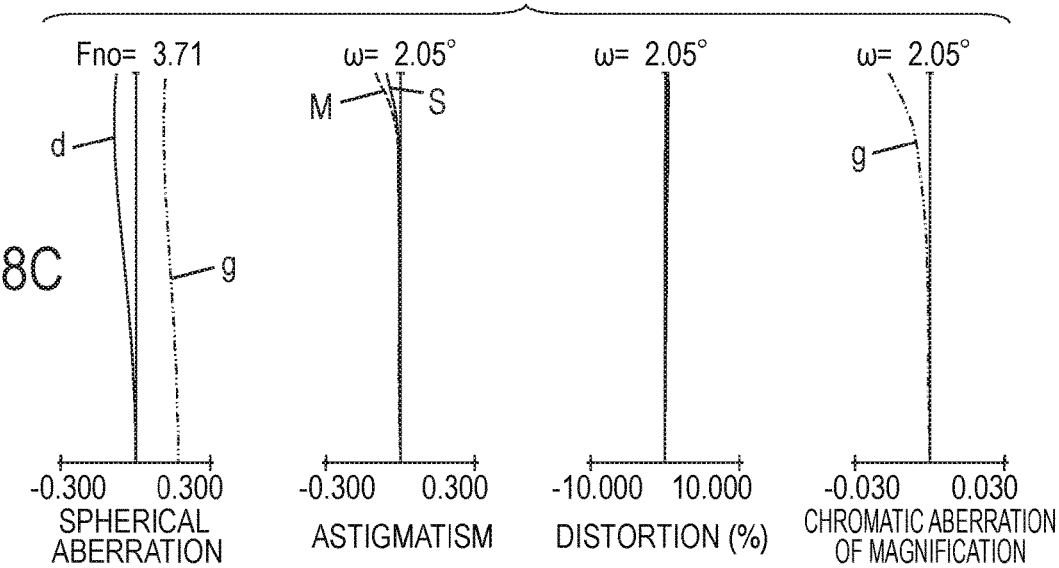
FIG. 8C is an aberration diagram of the zoom lens of Embodiment 4 at the telephoto end.
Figure 9:
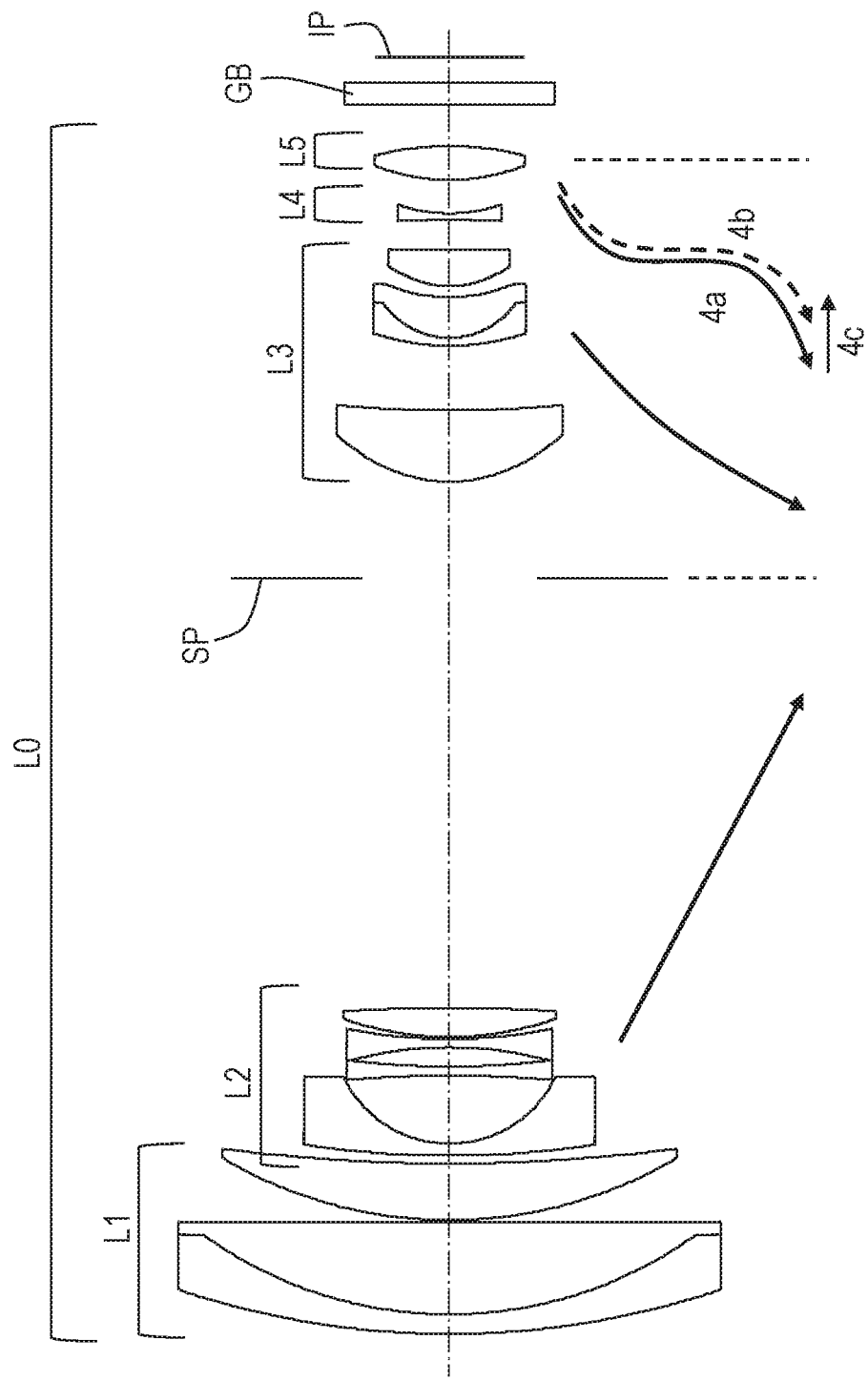
FIG. 9 is a cross-sectional view of a zoom lens of Embodiment 5 at the wide angle end.

FIGS. 8A, 8B, and 8C are aberration diagrams respectively illustrating the zoom lens of Embodiment 4 at the wide angle end, the intermediate zoom position, and the telephoto end (longest focal length).

Figure 10A:
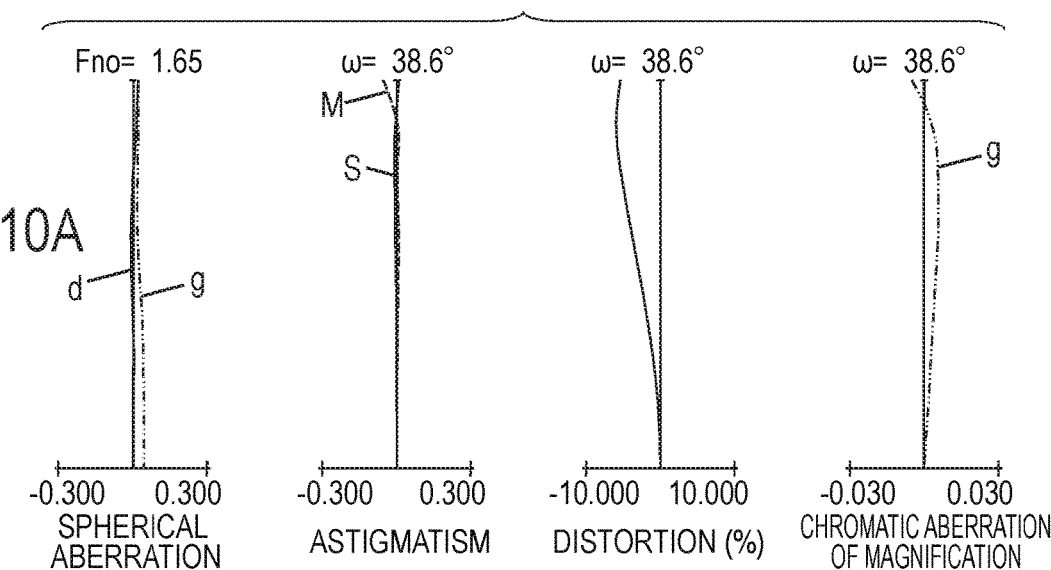
FIG. 10A is an aberration diagram of the zoom lens of Embodiment 5 at the wide angle end.
Figure 10B:
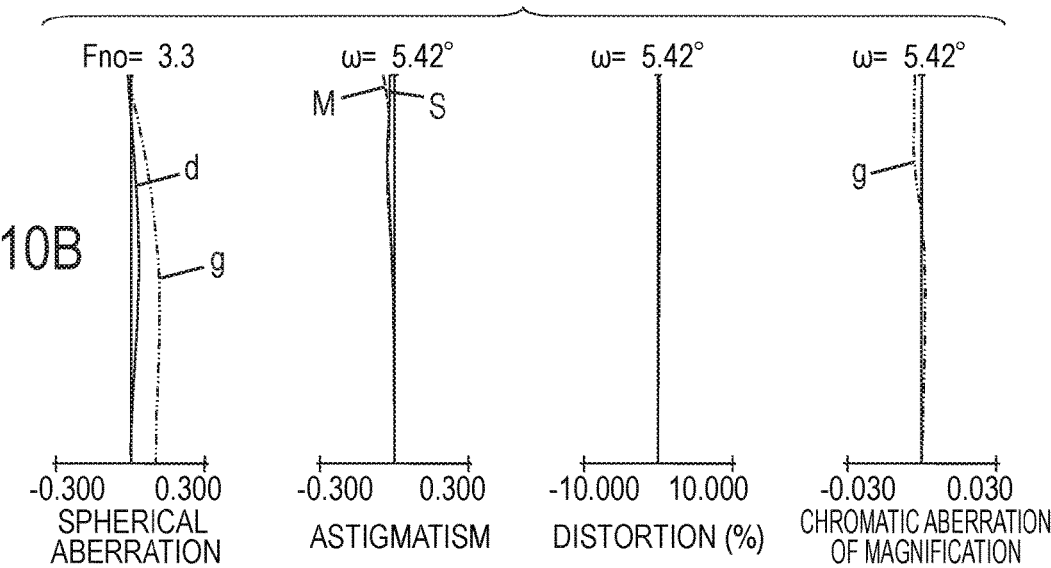
FIG. 10B is an aberration diagram of the zoom lens of Embodiment 5 at the intermediate zoom position.
Figure 10C:
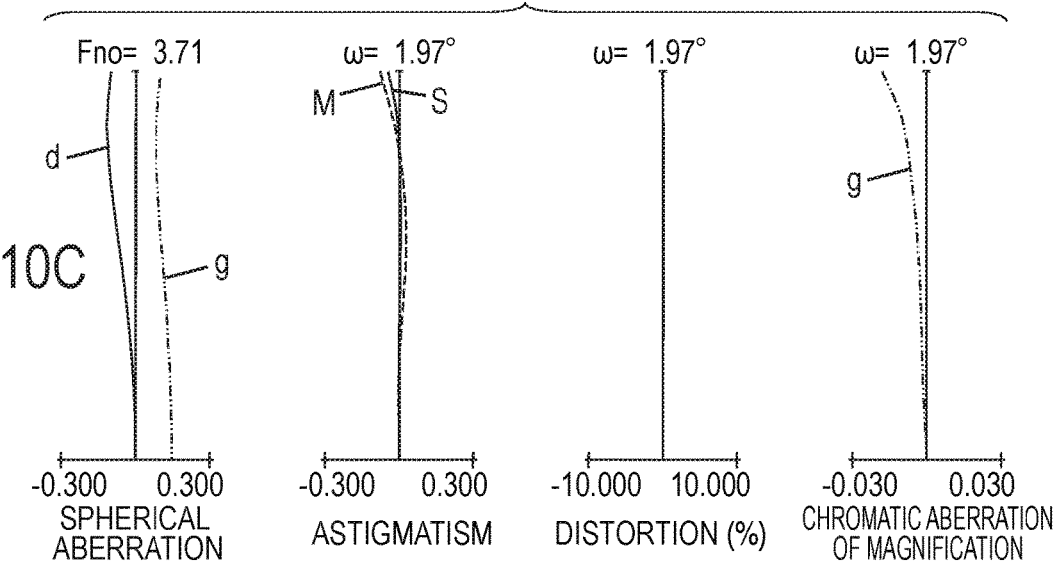
FIG. 10C is an aberration diagram of the zoom lens of Embodiment 5 at the telephoto end.
Figure 11:
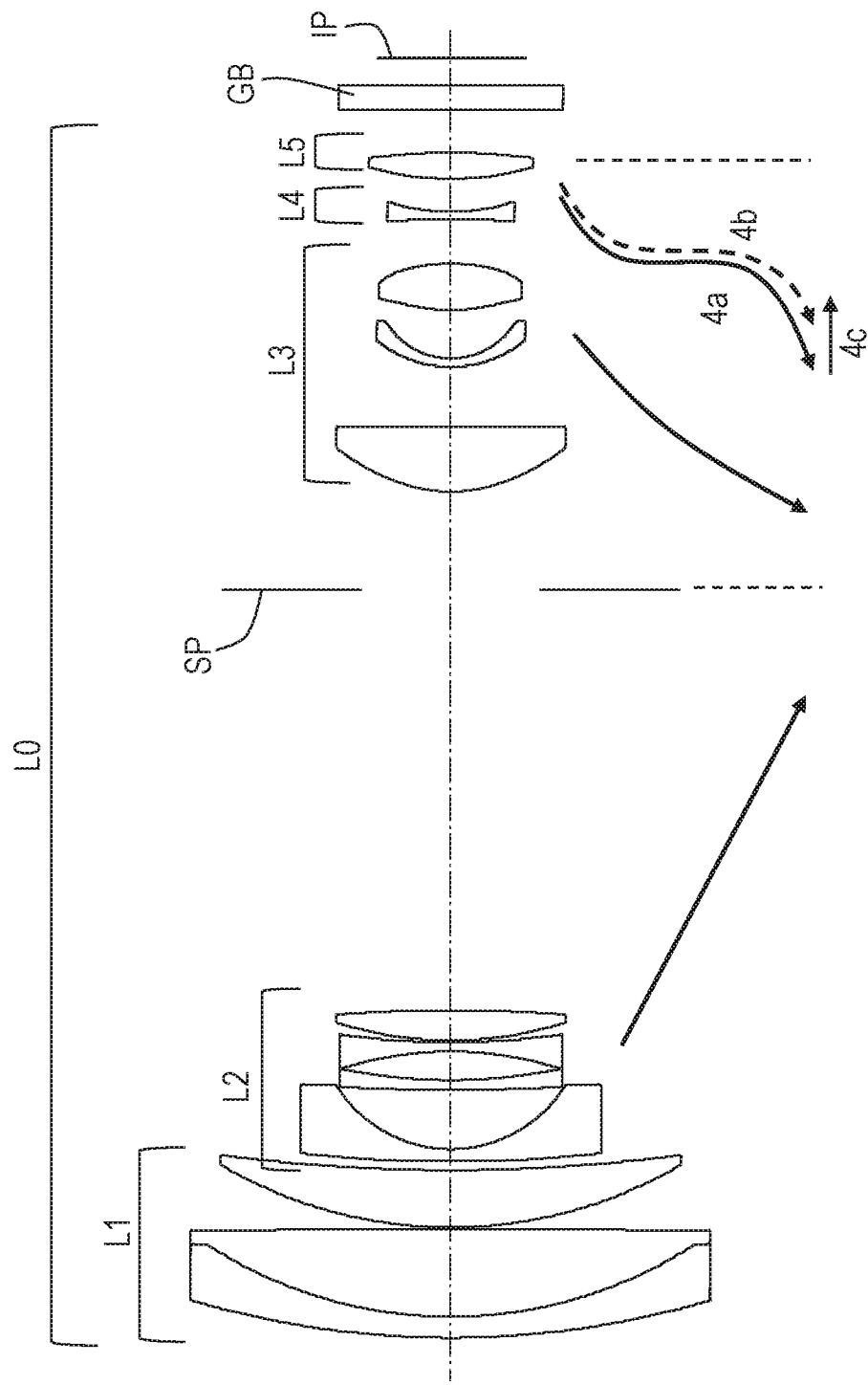
FIG. 11 is a cross-sectional view of a zoom lens of Embodiment 6 at the wide angle end.

FIGS. 10A, 10B, and 10C are aberration diagrams respectively illustrating the zoom lens of Embodiment 5 at the wide angle end, the intermediate zoom position, and the telephoto end (longest focal length).

Figure 12A:
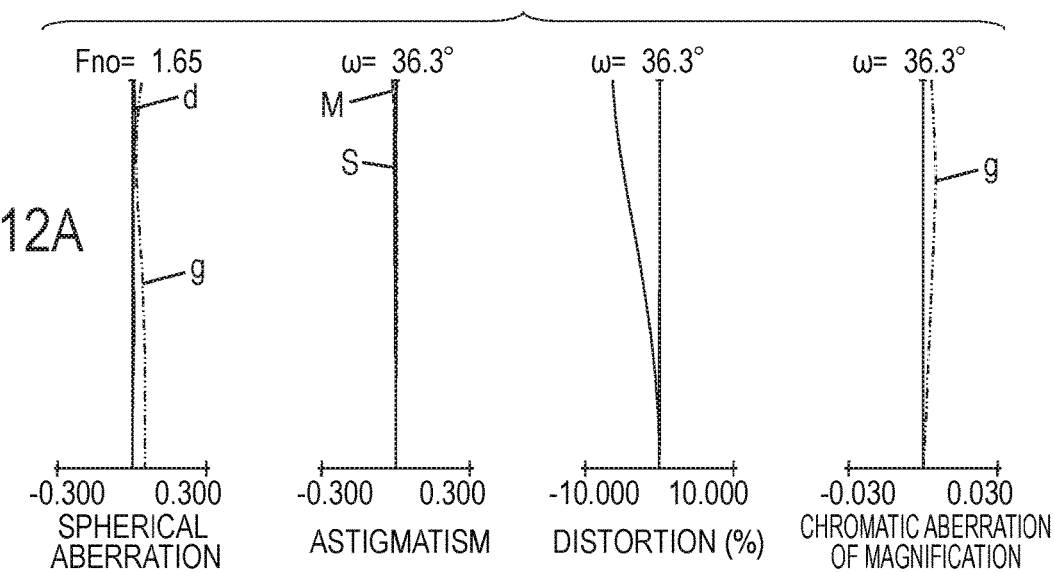
FIG. 12A is an aberration diagram of the zoom lens of Embodiment 6 at the wide angle end.
Figure 12B:
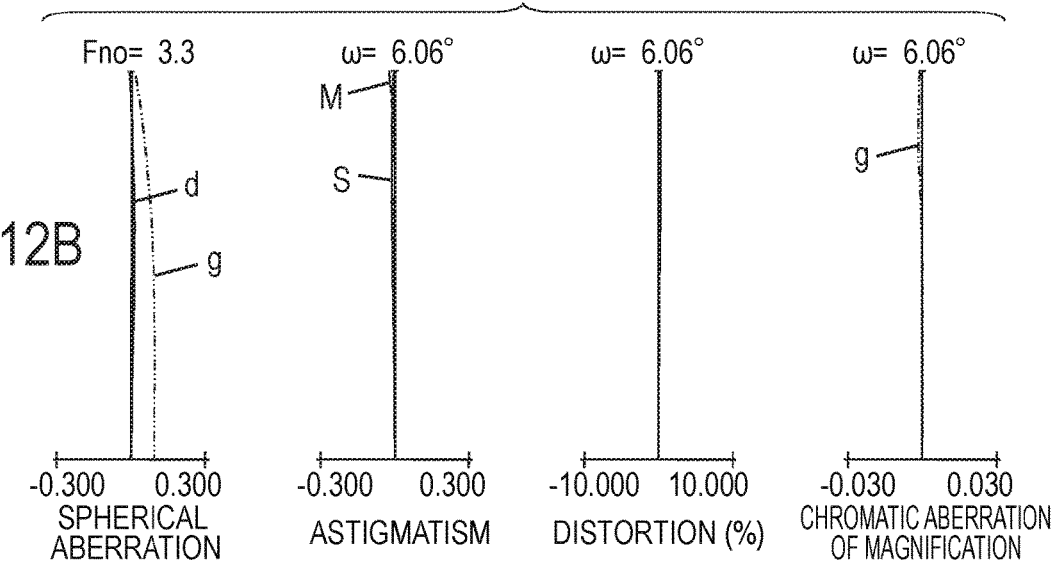
FIG. 12B is an aberration diagram of the zoom lens of Embodiment 6 at the intermediate zoom position.
Figure 12C:
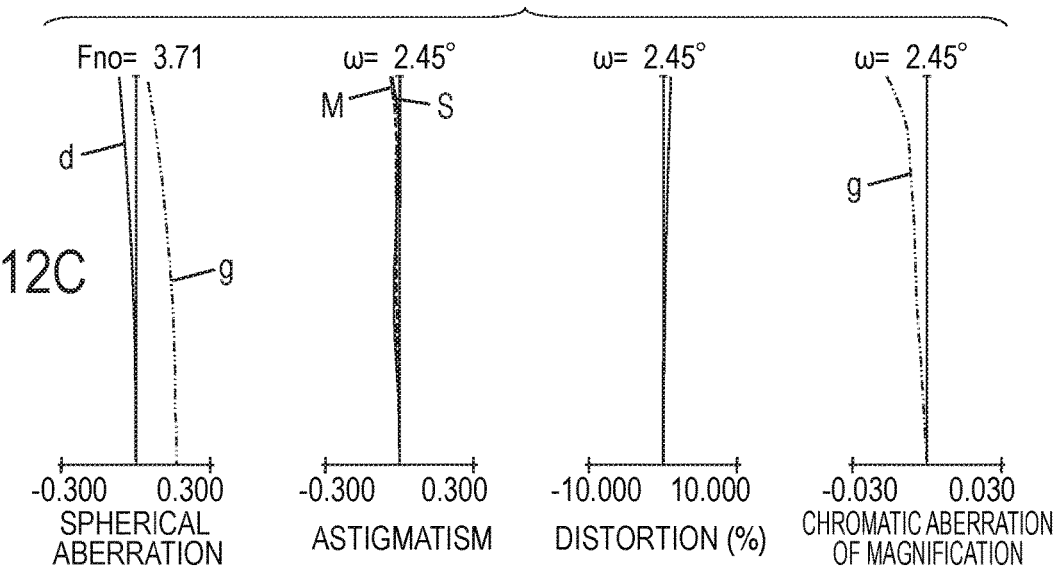
FIG. 12C is an aberration diagram of the zoom lens of Embodiment 6 at the telephoto end.
Figure 13:
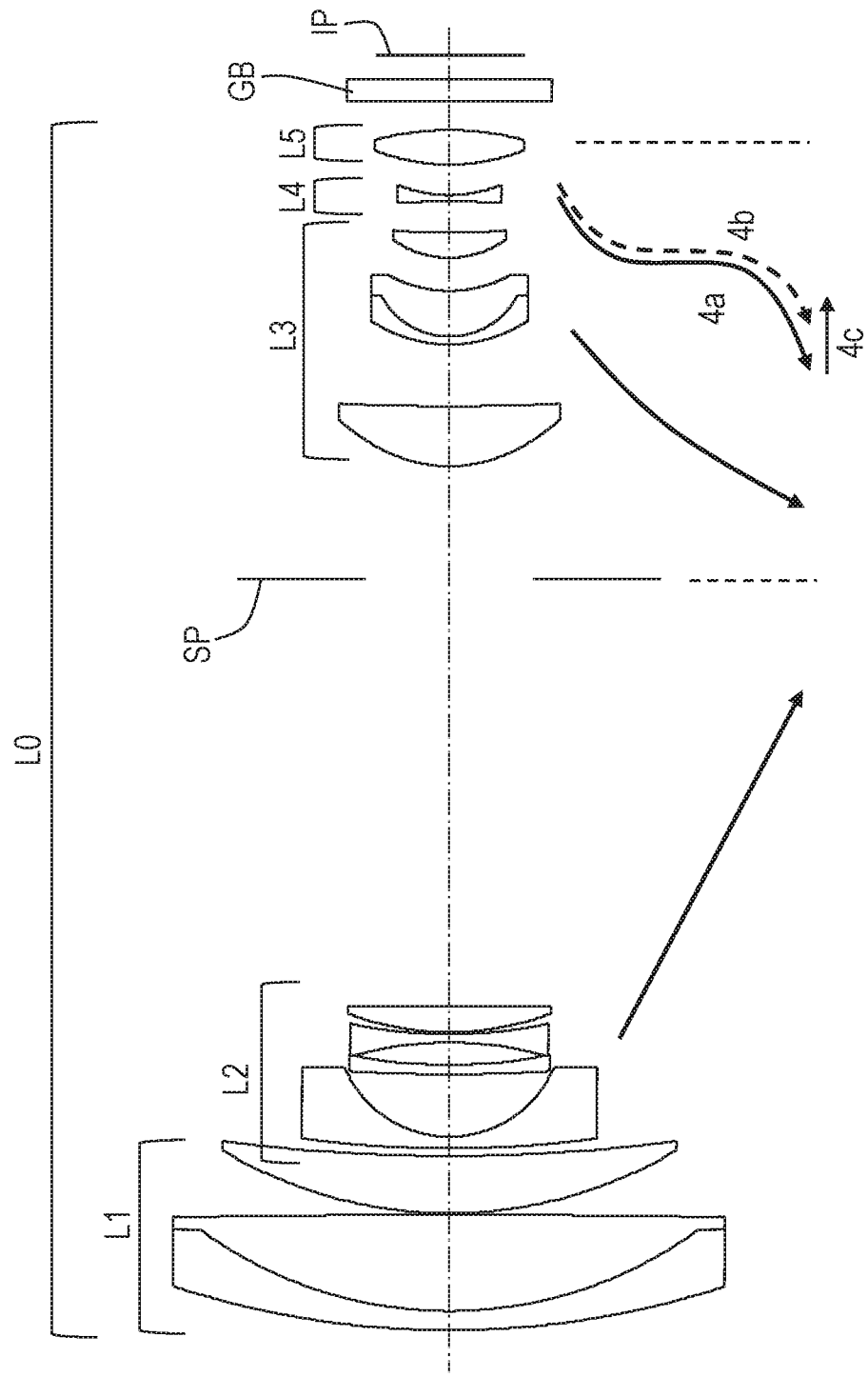
FIG. 13 is a cross-sectional view of a zoom lens of Embodiment 7 at the wide angle end.

FIGS. 12A, 12B, and 12C are aberration diagrams respectively illustrating the zoom lens of Embodiment 6 at the wide angle end, the intermediate zoom position, and the telephoto end (longest focal length).

Figure 14A:
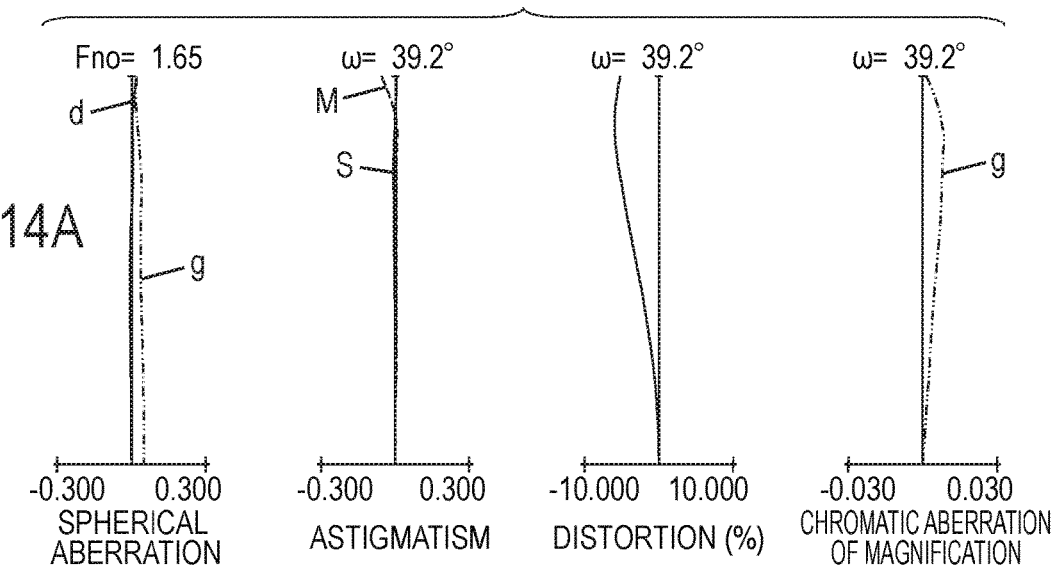
FIG. 14A is an aberration diagram of the zoom lens of Embodiment 7 at the wide angle end.
Figure 14B:
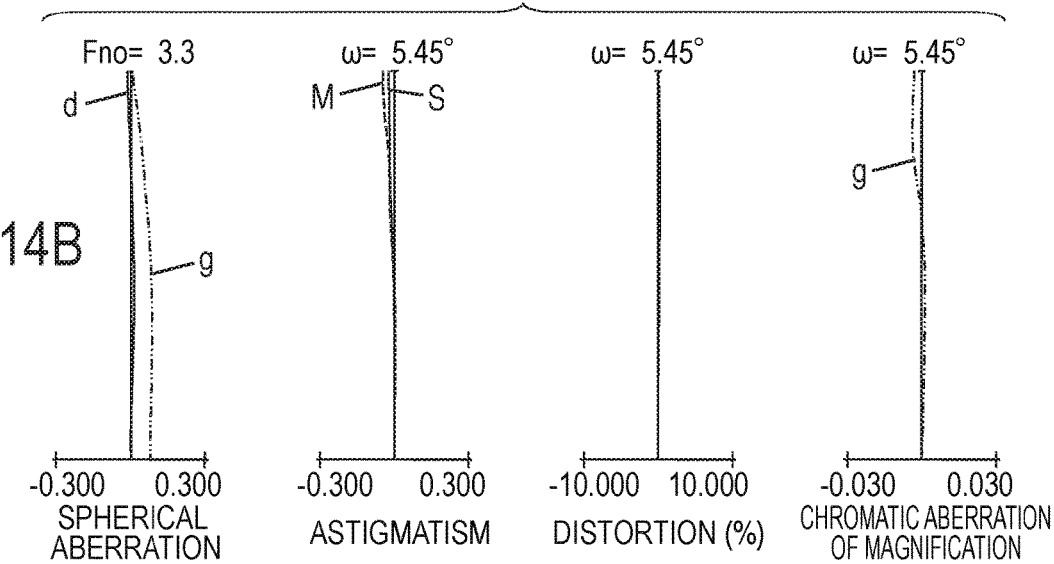
FIG. 14B is an aberration diagram of the zoom lens of Embodiment 7 at the intermediate zoom position.
Figure 14C:
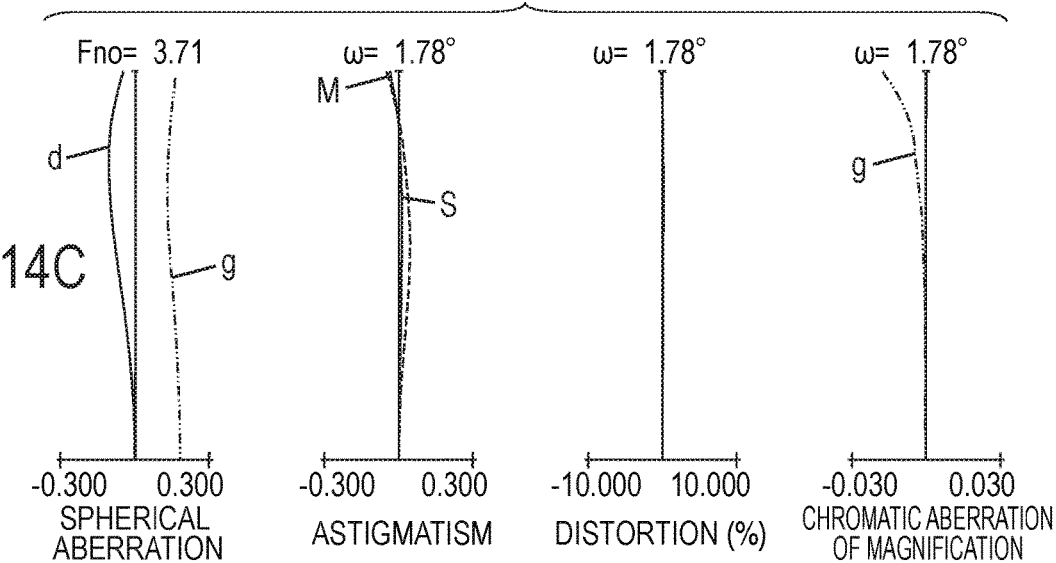
FIG. 14C is an aberration diagram of the zoom lens of Embodiment 7 at the telephoto end.

FIGS. 14A, 14B, and 14C are aberration diagrams respectively illustrating the zoom lens of Embodiment 7 at the wide angle end, the intermediate zoom position, and the telephoto end (longest focal length).

Embodiment 1 is a zoom lens with a zoom ratio of 21.51 and F-number of 1.65 to 3.71.

Embodiment 2 is a zoom lens with a zoom ratio of 21.92 and F-number of 1.65 to 3.71.

Embodiment 3 is a zoom lens with a zoom ratio of 21.92 and F-number of 1.65 to 3.71.

Embodiment 4 is a zoom lens with a zoom ratio of 19.92 and F-number of 1.65 to 3.71.

Embodiment 5 is a zoom lens with a zoom ratio of 21.92 and F-number of 1.65 to 3.71.

Embodiment 6 is a zoom lens with a zoom ratio of 15.93 and F-number of 1.65 to 3.71.

Embodiment 7 is a zoom lens with a zoom ratio of 24.92 and F-number of 1.65 to 3.71.

The zoom lens of each embodiment is an image pickup optical system used in image pickup apparatus such as a video camera, digital camera, TV camera, and monitoring camera. In the cross-sectional views, a subject side (object side) (front) is on the left and the image side (rear) is on the right. In the cross-sectional views, L0 represents the zoom lens. i represents the order of the lens units from the object side, and Li represents an i-th lens unit.

In the cross-sectional views, SP represents an aperture stop arranged on the object side of the third lens unit L3. In the cross-sectional views, GB represents an optical element corresponding to an optical filter, a face plate, a crystal low pass filter, an infrared cut filter, and so on. IP represents an image plane, and an image pickup element (photoelectric conversion element) such as a CCD sensor or a CMOS sensor is arranged when the zoom lens is used as an image pickup optical system for a video camera or a digital still camera.

Arrows indicate movement loci of the lens units and moving directions of the lens units during focusing in zooming (magnification) from the wide angle end to the telephoto end. In spherical aberration in the aberration diagrams, the reference symbol d of a solid line represents a d-line (wavelength of 587.6 nm) and the reference symbol g of a dashed double-dotted line represents a g-line (wavelength of 435.8 nm). In the astigmatism diagrams, the reference symbol M of a dotted line represents a meridional image plane of the d-line, and the reference symbol S of a solid line represents a sagittal image plane of the d-line. The chromatic aberration of magnification is expressed by the g-line with respect to the d-line. ω represents a half angle of view (a half value of an image pickup angle) (degree), and Fno represents F-number.

In the cross-sectional diagrams of Embodiments, L1 represents the first lens unit having the positive refractive power, L2 represents the second lens unit having the negative refractive power, L3 represents the third lens unit having the positive refractive power, and L4 represents the fourth lens unit having the negative refractive power. L5 represents the fifth lens unit having the positive refractive power. Embodiments each illustrates a five-unit zoom lens.

In Embodiments, during zooming, the first lens unit L1 and the fifth lens unit L5 do not move. During zooming from the wide angle end to the telephoto end, the second lens unit L2 moves toward the image side as indicated by the arrow. The third lens unit L3 moves toward the object side. The fourth lens unit L4 moves toward the object side. During zooming, the aperture stop SP does not move.

With the movement of the fourth lens unit L4, an image plane variation associated with the magnification is corrected and also focusing is performed. A solid winding line 4a and a dotted winding line 4b related to the fourth lens unit L4 are movement loci for correcting the image plane variation associated with the magnification during focusing to the infinity and to the close distance, respectively. Focusing from the infinity to the close distance is performed by moving the fourth lens unit L4 toward the rear side as indicated by an arrow 4C. Focusing is not limited to be performed by the fourth lens unit L4 and may be performed by different single lens unit or multiple lens units. For example, focusing may be performed by a part of the lenses of the second lens unit L2, or the fifth lens unit L5.

In the abovementioned positive lead type five-unit zoom lens, use of a zooming method of moving the first lens unit during zooming achieves the compact zoom lens and facilitates the high zoom ratio. However, in a camera for monitoring use for example, if the first lens unit is movable during zooming, shock resistance, water resistance, and dust resistance are decreased. For this reason, the first lens unit in the zoom lens of Embodiments does not move during zooming.

In Embodiments, during zooming from the wide angle end to the telephoto end, the third lens unit L3 moves from the image side to the object side as indicated by the arrow. The third lens unit L3 is arranged closer to the image side at the wide angle end than at the telephoto end, and this increases the interval between the third lens unit L3 and the second lens unit L2 having the negative refractive power. This makes it easier to increase the focal length of the zoom lens at the wide angle end toward the wide angle side.

In addition, during zooming from the wide angle end to the telephoto end, the movement of the third lens unit L3 toward the object side expands a space on the image side of the third lens unit L3. As a result, a space required for the movement of the fourth lens unit L4 during zooming from the wide angle end to the telephoto end is efficiently secured, and shortening of the total length of the lens is effectively achieved.

The first lens unit L1 does not move during focusing; however, the first lens unit L1 may be moved for aberration correction if necessary. Blurring of a captured image due to vibration of the zoom lens during image capturing may be corrected by moving all or a part of the lenses of the third lens unit L3 such that the components are set in a direction perpendicular to an optical axis.

The zoom lens of each of Embodiments is a compact zoom lens in which the elements are specified to form the zoom lens having a high zoom ratio, such as a zoom ratio of 20. In order to secure the efficient zoom ratio while shortening the total length of the lens, it is preferred to achieve effective use of the space on the image side of the third lens unit L3. To this end, the refractive power and the movement amount during zooming from the wide angle end to the telephoto end of the third lens unit L3 are important factors.

Thus, in Embodiments, the following conditional expressions are satisfied:

$$-1.52 \le f3/f4 \le -1.25 \quad (1);$$

$$3.0 \le |M2/M3| \le 6.0 \quad (2), \text{ where}$$

f3 represents a focal length of the third lens unit L3, and f4 represents a focal length of the fourth lens unit L4. M2 represents the movement amount of the second lens unit L2 during zooming from the wide angle end to the telephoto end, and M3 represents the movement amount of the third lens unit L3 during zooming from the wide angle end to the telephoto end.

The movement amount of the lens unit during zooming from the wide angle end to the telephoto end is a difference of positions on the optical axis between the lens unit at the wide angle end and at the telephoto end. When the lens unit at the telephoto end is positioned closer to the image side than the lens unit at the wide angle end, the sign of the movement amount of the lens unit is positive, and when the lens unit at the telephoto end is positioned closer to the object side than the lens unit at the wide angle end, the sign of the movement amount of the lens unit is negative.

Next, technical meanings of the abovementioned conditional expressions are described. The conditional expression (1) is for appropriately setting a ratio of the focal length f3 of the third lens unit L3 and the focal length f4 of the fourth lens unit L4.

When the value exceeds the upper limit of the conditional expression (1) and the positive refractive power of the third lens unit L3 becomes stronger, it is difficult to correct the spherical aberration at the wide angle end. Also, variations of field curvature and comatic aberration are increased during zooming from the wide angle end to the telephoto end, and it is difficult to reduce the aberration variations. When the value falls below the lower limit of the conditional expression (1) and the positive refractive power of the third lens unit L3 becomes stronger, it is not preferable because the movement amount of the third lens unit L3 during zooming from the wide angle end to the telephoto end is increased and the total length of the lens is increased.

The conditional expression (2) is for appropriately setting a ratio of the movement amount of the second lens unit L2 and the movement amount of the third lens unit L3 during zooming from the wide angle end to the telephoto end. When the value exceeds the upper limit of the conditional expression (2) and the movement amount of the second lens unit L2 as a main magnification lens unit is increased, it is not preferable because the total length of the lens is increased and the effective diameter of the front element is increased.

When the value falls below the lower limit of the conditional expression (2) and the movement amount of the third lens unit L3 is increased, the aberration variations during zooming are increased. Specifically, the third lens unit L3 performs correction of the spherical aberration at the wide angle end and suppression of the variations of the field curvature and the comatic aberration during zooming from the wide angle end to the telephoto end. Thus, if the value falls below the lower limit, it is difficult to reduce the aberration variations, and also it is difficult to obtain the high optical performance in the entire region of zooming.

In Embodiments, preferably, numerical ranges of the conditional expressions (1) and (2) are set as below:

$$-1.50 \le f3/f4 \le -1.30 \quad (1a);$$

$$3.1 \le |M2/M3| \le 5.0 \quad (2a).$$

More preferably, numerical ranges of the conditional expressions (1a) and (2a) are set as below:

$$-1.50 \le f3/f4 \le -1.33 \quad (1b);$$

$$3.2 \le |M2/M3| \le 4.8 \quad (2b).$$

With the abovementioned configurations, Embodiments each obtain a compact zoom lens with the high zoom ratio, such as a zoom ratio of 20, and the high optical performance in the entire zoom range.

In Embodiments, preferably, one or more of the following conditional expressions are satisfied. f1 represents a focal length of the first lens unit L1. fw represents a focal length of the zoom lens at the wide angle end. M4 represents the movement amount of the fourth lens unit L4 during zooming from the wide angle end to the telephoto end. β3W represents lateral magnification of the third lens unit L3 at the wide angle end, β3T represents lateral magnification of the third lens unit L3 at the telephoto end, β4W represents lateral magnification of the fourth lens unit L4 at the wide angle end, and β4T represents lateral magnification of the fourth lens unit L4 at the telephoto end. f2 represents a focal length of the second lens unit L2. f5 represents a focal length of the fifth lens unit L5.

Preferably, one or more of the following conditional expressions are satisfied:

$$2.0 \le f1/f3 \le 4.0 \quad (3);$$

$$3.0 \le f1/f4 \le 5.0 \quad (4);$$

$$6.0 \le f1/fw \le 12.0 \quad (5);$$

$$2.0 \le f3/fw \le 4.0 \quad (6);$$

$$1.0 \le f4/fw \le 3.0 \quad (7);$$

$$0.2 \le M4/M3 \le 2.0 \quad (8);$$

$$1.1 \le |(\beta 3T \times \beta 4T)/(\beta 3W \times \beta 4W)| \le 2.0 \quad (9);$$

$$-2.5 \le f3/f2 \le -1.0 \quad (10);$$

$$0.5 \le f3/f5 \le 2.0 \quad (11).$$

Next, technical meanings of the abovementioned conditional expressions are described. The conditional expression (3) is for appropriately setting a ratio of the focal length of the first lens unit L1 and the focal length of the third lens unit L3. When the value exceeds the upper limit of the conditional expression (3) and the positive refractive power of the first lens unit L1 becomes weaker, it is not preferable because the total length of the lens is increased. When the value falls below the lower limit of the conditional expression (3) and the positive refractive power of the third lens unit L3 becomes weaker, it is not preferable because the interval between the third lens unit L3 and the image plane is too long and the total length of the lens is increased.

The conditional expression (4) is for appropriately setting a ratio of the focal length of the first lens unit L1 and the focal length of the fourth lens unit L4. When the value exceeds the upper limit of the conditional expression (4) and the negative refractive power of the fourth lens unit L4 becomes stronger (when the absolute value of the negative refractive power is increased), it is difficult to correct variations of the field curvature and flare associated with a variation of a subject distance (associated with focusing). When the value falls below the lower limit of the conditional expression (4) and the negative refractive power of the fourth lens unit L4 becomes weaker (when the absolute value of the negative refractive power is decreased), it is not preferable because the movement amount of the fourth lens unit L4 required for focusing is excessively increased and the total length of the lens is increased.

The conditional expression (5) is for appropriately setting a ratio of the focal length of the first lens unit L1 and the focal length of the zoom lens at the wide angle end. When the value exceeds the upper limit of the conditional expression (5) and the positive refractive power of the first lens unit L1 becomes weaker, it is not preferable because the total length of the lens is increased. When the value falls below the lower limit of the conditional expression (5) and the positive refractive power of the first lens unit L1 becomes stronger, it is difficult to correct the spherical aberration and the field curvature at the telephoto end.

The conditional expression (6) is for appropriately setting a ratio of the focal length of the third lens unit L3 and the focal length of the zoom lens at the wide angle end. When the value exceeds the upper limit of the conditional expression (6) and the positive refractive power of the third lens unit L3 becomes weaker, it is not preferable because the interval between the third lens unit L3 and the image plane is too long and the total length of the lens is increased. When the value falls below the lower limit of the conditional expression (6) and the positive refractive power of the third lens unit L3 becomes stronger, it is difficult to correct the spherical aberration at the wide angle end. In addition, the variations of the field curvature and the comatic aberration during zooming are increased, and it is difficult to reduce the aberration variations.

The conditional expression (7) is for appropriately setting a ratio of the focal length of the fourth lens unit L4 and the focal length of the zoom lens at the wide angle end. When the value exceeds the upper limit of the conditional expression (7) and the negative refractive power of the fourth lens unit L4 becomes weaker, it is not preferable because the movement amount of the fourth lens unit L4 required for focusing is excessively increased and the total length of the lens is increased. When the value falls below the lower limit of the conditional expression (7) and the negative refractive power of the fourth lens unit L4 becomes stronger, it is difficult to correct the variations of the field curvature and the flare during focusing.

The conditional expression (8) is for appropriately setting a ratio of the movement amount of the third lens unit L3 and the movement amount of the fourth lens unit L4 during zooming from the wide angle end to the telephoto end. When the value exceeds the upper limit of the conditional expression (8) and the movement amount of the fourth lens unit L4 is increased, it is not preferable because a driving range required for zooming is excessively increased and the total length of the lens is increased. When the value falls below the lower limit of the conditional expression (8) and the movement amount of the third lens unit L3 is increased, it is difficult to correct the variations of the field curvature and the comatic aberration associated with zooming.

The conditional expression (9) is for appropriately setting a magnification ratio of the third lens unit L3 and a magnification ratio of the fourth lens unit L4. When the value exceeds the upper limit of the conditional expression (9) and the magnification ratio of the third lens unit L3 and the magnification ratio of the fourth lens unit L4 are excessively increased, a magnification ratio required for the second lens unit L2 is decreased. Also, since the positive refractive power of the third lens unit L3 and the negative refractive power of the fourth lens unit L4 become excessively strong, the variations of the field curvature and the comatic aberration during zooming are increased, and additionally it is difficult to correct the variations of the field curvature and the flare during focusing.

When the value falls below the lower limit of the conditional expression (9), it is not good because the magnification ratio required for the second lens unit L2 is excessively increased for securing the magnification ratio of the zoom lens from the wide angle end to the telephoto end. Thus, it is not preferable because the movement amount of the second lens unit L2 required for zooming is increased and the total length of the lens is increased.

The conditional expression (10) is for appropriately setting a ratio of the focal length of the third lens unit L3 and the focal length of the second lens unit L2. When the value exceeds the upper limit of the conditional expression (10) and the positive refraction power of the third lens unit L3 becomes stronger, it is difficult to correct the spherical aberration at the wide angle end. Also, it is difficult to reduce the variations of the field curvature and the comatic aberration during zooming. When the value falls below the lower limit of the conditional expression (10), the negative refraction power of the second lens unit L2 becomes stronger, and it is difficult to reduce the variations of the field curvature and the chromatic aberration of magnification during zooming.

The conditional expression (11) is for appropriately setting a ratio of the focal length of the third lens unit L3 and the focal length of the fifth lens unit L5. When the value exceeds the upper limit of the conditional expression (11) and the positive refraction power of the fifth lens unit L5 becomes stronger, it is difficult to correct the field curvature in the entire region of zooming. When the value falls below the lower limit of the conditional expression (11) and the positive refraction power of the fifth lens unit L5 becomes weaker, it is not preferable because the distance between the fifth lens unit L5 and the image plane is increased and the total length of the lens is increased.

In Embodiments, it is more preferable for the aberration correction that numerical ranges of the conditional expressions (3) to (11) are set as below:

$$2.5 \leq f1/f3 \leq 3.5 \quad (3a);$$

$$3.5 \leq |f1/f4| \leq 4.8 \quad (4a);$$

$$7.0 \leq f1/fw \leq 11.0 \quad (5a);$$

$$2.5 \leq f3/fw \leq 3.6 \quad (6a);$$

$$1.8 \leq |f4/fw| \leq 2.5 \quad (7a);$$

$$0.5 \leq |M4/M3| \leq 1.5 \quad (8a);$$

$$1.2 \leq |(\beta 3T \times \beta 4T)/(\beta 3W \times \beta 4W)| \leq 2.5 \quad (9a);$$

$$-2.2 \leq f3/f2 \leq -1.5 \quad (10a);$$

$$0.8 \leq f3/f5 \leq 1.5 \quad (11a).$$

More preferably, numerical ranges of the conditional expressions (3a) to (11a) are set as below:

$$2.8 \leq f1/f3 \leq 3.2 \quad (3b);$$

$$3.9 \leq |f1/f4| \leq 4.5 \quad (4b);$$

$$8.0 \leq f1/fw \leq 10.0 \quad (5b);$$

$$2.8 \leq f3/fw \leq 3.2 \quad (6b);$$

$$2.0 \leq |f4/fw| \leq 2.3 \quad (7b);$$

$$0.9 \leq |M4/M3| \leq 1.2 \quad (8b);$$

$$1.3 \leq |(\beta 3T \times \beta 4T)/(\beta 3W \times \beta 4W)| \leq 1.8 \quad (9b);$$

$$-1.9 \leq f3/f2 \leq -1.7 \quad (10b);$$

$$1.0 \leq f3/f5 \leq 1.3 \quad (11b).$$

With the abovementioned configurations, Embodiments each obtain a compact zoom lens with the high zoom ratio, such as a zoom ratio of 20, and the high optical performance in the entire zoom range.

In Embodiments, more preferably, one or more of the following configurations are satisfied. The first lens unit L1 consists of a negative lens, a positive lens, and a positive lens arranged in the order from the object side to the image side. With such a configuration, less number of the lenses forming the first lens unit L1 is used; thus, shortening of the total length of the lens is achieved, and also correction of the spherical aberration and axial chromatic aberration at the telephoto end is facilitated.

The second lens unit L2 consists of a negative lens that has a concaved surface on the image side and has stronger curvature on the image side than the object side, a negative lens, a negative lens, and a positive lens that has a convex surface on the object side, which are arranged in the order from the object side to the image side. With such a configuration, reduction of the aberration variations such as the field curvature, comatic aberration, and chromatic aberration of magnification during zooming from the wide angle end to the telephoto end is facilitated.

In Embodiments 1, 2, 4, and 6, the third lens unit L3 has the following configuration in the order from the object side to the image side. The configuration includes a positive lens that has a convex surface on the object side and has an aspherical shaped surface, a negative lens that has a concaved surface on the image side and has a meniscus shape, and a positive lens that has a convex surface on the image side and has an aspherical shaped surface. With such a configuration, reduction of the variations of aberration, such as the spherical aberration at the wide angle end and the field curvature and the comatic aberration during zooming from the wide angle end to the telephoto end, is facilitated.

In Embodiments 3, 5, and 7, the third lens unit L3 consists of, in the order from the object side to the image side, a positive lens that has a convex surface on the object side and has an aspherical shaped surface, a cemented lens, and a positive lens that has a convex surface on the object side and has an aspherical shaped surface. In the order from the object side to the image side, the cemented lens herein bonds a negative lens and a positive lens so that a surface of the cemented lens is a convex surface on the object side and a positive lens has a concaved surface on the image side.

With such configurations, the variations of aberration, such as the spherical aberration and the axial chromatic aberration at the wide angle end and the field curvature and the comatic aberration during zooming from the wide angle end to the telephoto end, is reduced, and also the flare around a screen in the entire region of zooming is preferably reduced. The fourth lens unit L4 consists of a single negative lens. Specifically, the fourth lens unit L4 consists of a negative lens that has a concaved surface on the image side. For the aberration correction, the fourth lens unit L4 may consist of a cemented lens having a negative refractive power consisting of a negative lens and a positive lens cemented together, if necessary.

With such a configuration, less number of the lenses forming the fourth lens unit L4 is used; thus, shortening of the total length of the lens is achieved. In addition, the apparatus configuration of the fourth lens unit L4 including the focusing function is simplified, and minimization of the overall apparatus is facilitated while achieving improvement of the focusing speed.

The fifth lens unit L5 consists of a single positive lens. Specifically, the fifth lens unit L5 consists of a positive lens that has a convex surface on the object side. For the aberration correction, the fifth lens unit L5 may consist of a cemented lens having a positive refractive power consisting of a positive lens and a negative lens cemented together, if necessary. With such a configuration, less number of the lenses forming the fifth lens unit L5 is used; thus, shortening of the total length of the lens is achieved, and also the field curvature of the entire region of zooming is preferably corrected.

In addition, for the aberration correction, at least one surface of the fifth lens unit L5 may have an aspherical shape, if necessary. The fifth lens unit L5 does not move during zooming. With such configurations, since the lens unit arranged closest to the image plane does not have to move during zooming, the apparatus configuration between the fifth lens unit L5 and the image plane is simplified, and minimization of the overall apparatus is facilitated.

The aperture stop SP is arranged between the second lens unit L2 and the third lens unit L3 and does not move during zooming. Arrangement of the aperture stop SP between the second lens unit L2 and the third lens unit L3 shortens the distance between a lens surface closest to the object side in the entire zoom lens and the aperture stop SP and achieves minimization of the effective diameter of the front element. Since the aperture stop SP does not move during zooming, the aperture stop SP and the apparatus configuration for holding the aperture stop SP are simplified, and minimization of the overall apparatus is achieved.

With the abovementioned configurations, the compact zoom lens with the high zoom ratio, such as a zoom ratio of 20, obtains the high optical performance in the entire zoom range.

Next, an example of a monitoring camera (image pickup apparatus) in which the zoom lens according to the embodiment of the present invention is used as an image pickup optical system is described with reference to FIG. 15.

Figure 15:
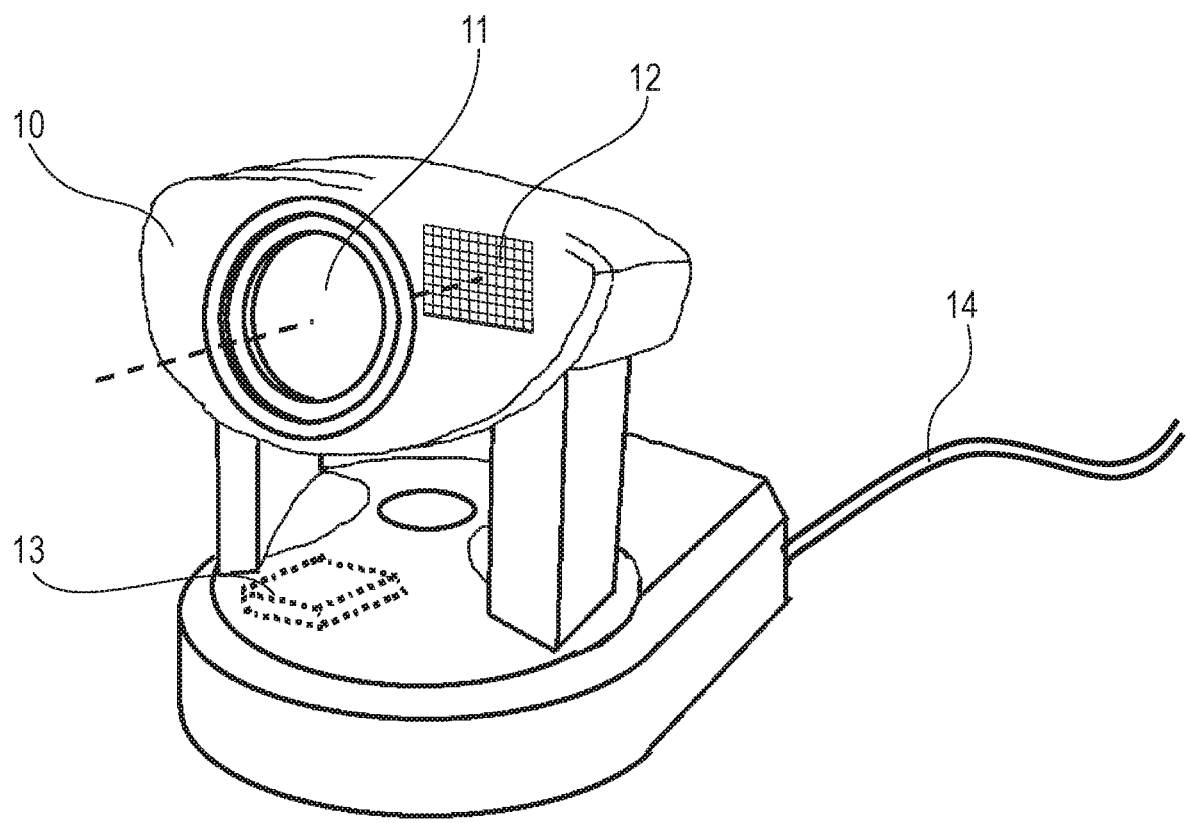
FIG. 15 is a schematic view of a main part of image pickup apparatus (monitoring camera) of an embodiment.

In FIG. 15, the reference numeral 10 represents a monitoring camera main body, and the reference numeral 11 represents an image pickup optical system consisting of the zoom lens according the embodiment of the present invention. The reference numeral 12 represents an image pickup element that receives light of a subject image formed by the zoom lens, the reference numeral 13 represents a recording unit that records information, and the reference numeral 14 represents a network cable for information transmission.

The application of the zoom lens according to the embodiment of the present invention to an image pickup device such as a monitoring camera as described above makes it possible to obtain a compact image pickup device with the high optical performance. If a photoelectric conversion element such as a CMOS is used as an image pickup element, it is possible to facilitate achievement of higher image quality of an output image by the electronic aberration correction.

Preferable embodiments of the present invention are described above; however, the present invention is not limited to the embodiments and can be modified and changed in various ways within a range of the gist.

For example, an image pickup system (monitoring camera system) including the zoom lens of Embodiments and a control unit for controlling the zoom lens may be formed. In this case, the control unit may control the zoom lens such that the lens units are moved as described above during zooming.

In this case, the control unit is not necessarily integrated with the zoom lens and may be formed to be separated from the zoom lens. For example, the control unit (control device) that is arranged away from a driving unit for driving the lenses of the zoom lens may employ a configuration including a transmission unit for transmitting a control signal (command) for controlling the zoom lens. According to such a control unit, it is possible to remotely operate the zoom lens.

The control unit may be provided with an operation unit such as a controller and a button for remotely operate the zoom lens to employ a configuration for controlling the zoom lens in response to input from the user to the operation unit. For example, an enlarging button and a reducing button as the operation unit are provided, and the magnification of the zoom lens is increased when the user presses the enlarging button. In order to decrease the magnification of the zoom lens when the user presses the reducing button, the control unit may be configured to transmit a signal to the driving unit of the zoom lens.

The image pickup system may include a display unit such as a crystal panel for displaying information (movement state) regarding zooming of the zoom lens. The information regarding zooming of the zoom lens is zoom magnification (zoom state) and the movement amount (movement state) of the lens units, for example. In this case, the user can remotely operate the zoom lens using the operation unit by watching the information regarding zooming of the zoom lens displayed on the display unit. In this case, the display unit and the operation unit may be integrated by employing a touch panel, for example.

Numerical Data 1 to 7 corresponding to Embodiments 1 to 7 are indicated below. In Numerical Data, ri represents a curvature radius of an i-th surface in the order from the object side, di represents interval between the i-th surface and an i+1-th surface (lens thickness or air interval), ndi and vdi respectively represent a refractive index and Abbe number of material (optical medium) between the i-th surface and the i+1-th surface. In Numerical Data 1 to 7, two surfaces closest to the image side are plane surfaces corresponding to glass blocks.

BF represents back focus, which is the air-equivalent distance from the last lens surface to the close axis image plane. The total length of the lens is a length from the first lens surface to the last lens surface to which a value of the back focus BF is added. * means an aspherical surface. In the aspherical shape, an X-axis is in the optical axis direction, an h-axis is in a direction perpendicular to the optical axis, a traveling direction of light is positive, R represents a close axis curvature radius, k represents a circle estimated number, and A4, A6, A8, and A10 each represents an aspherical diameter number. It is expressed by the following expression:

$$X = \frac{(1/R)h}{1+\sqrt{1-(1+k)(h/R)^2}} + A4h^4 + A6h^6 + A8h^8 + A10h^{10}.$$

For example, expression of "e-x" means "×10$^{-x}$." Relationships between the abovementioned conditional expressions and numerical values in the numerical embodiments are illustrated in Table 1.

Numerical Embodiment 1

| [Unit mm] | | | |
|---|---|---|---|
| Surface data | | | |
| Surface number | r | d | nd | vd |
| 1 | 59.142 | 1.50 | 1.85478 | 24.8 |
| 2 | 30.477 | 6.95 | 1.49700 | 81.5 |
| 3 | 719.759 | 0.15 | | |
| 4 | 32.916 | 3.84 | 1.83481 | 42.7 |
| 5 | 131.359 | (variable) | | |
| 6 | 93.715 | 0.90 | 1.91082 | 35.3 |

-continued

[Unit mm]

| | | | | |
|---|---|---|---|---|
| 7 | 9.746 | 3.99 | | |
| 8 | 43.827 | 0.70 | 1.83481 | 42.7 |
| 9 | 21.449 | 2.51 | | |
| 10 | −32.227 | 0.65 | 1.77250 | 49.6 |
| 11 | 38.138 | 0.15 | | |
| 12 | 22.476 | 2.28 | 1.95906 | 17.5 |
| 13 | −370.085 | (variable) | | |
| 14(stop) | ∞ | (variable) | | |
| 15* | 10.918 | 4.15 | 1.69350 | 53.2 |
| 16 | 203.150 | 4.43 | | |
| 17 | 8.385 | 0.60 | 1.95906 | 17.5 |
| 18 | 5.568 | 3.61 | | |
| 19* | 12.503 | 3.40 | 1.49710 | 81.6 |
| 20* | −15.263 | (variable) | | |
| 21 | −34.076 | 0.50 | 1.95375 | 32.3 |
| 22 | 16.649 | (variable) | | |
| 23 | 22.825 | 1.99 | 2.00100 | 29.1 |
| 24 | −37.175 | 2.58 | | |
| 25 | ∞ | 1.72 | 1.51633 | 64.1 |
| 26 | ∞ | 2.00 | | |
| image plane | ∞ | | | |

Aspheric surface data

15th surface

K = −1.83932e+000
A4 = 1.13163e−004
A6 = −4.26087e−007
A8 = 4.40683e−009
A10 = −3.84758e−011

19th surface

K = 1.35935e+000
A4 = −3.16271e−004
A6 = −2.23477e−006
A8 = −2.25020e−007

20th surface

K = 0.00000e+000
A4 = −3.62501e−004
A6 = −4.73602e−006
A8 = −1.09879e−007
A10 = −3.13085e−009

Various data
Zoom ratio 21.51

| | Wide angle | Middle | Telephoto |
|---|---|---|---|
| Focal length | 5.34 | 43.72 | 114.77 |
| F-number | 1.65 | 3.30 | 3.71 |
| Half angle of view (deg) | 36.86 | 5.23 | 2.00 |
| Image height | 4.00 | 4.00 | 4.00 |
| Total lens length | 95.53 | 95.53 | 95.53 |
| BF | 5.72 | 5.72 | 5.72 |
| d5 | 0.60 | 24.80 | 30.84 |
| d13 | 31.04 | 6.85 | 0.80 |
| d14 | 9.92 | 2.40 | 0.60 |
| d20 | 3.58 | 7.03 | 2.27 |
| d22 | 2.38 | 6.45 | 13.01 |

Zoom lens unit data

| Unit | Start surface | Focal length |
|---|---|---|
| 1 | 1 | 47.48 |
| 2 | 6 | −9.44 |
| 3 | 14 | ∞ |
| 4 | 15 | 16.60 |
| 5 | 21 | −11.67 |
| 6 | 23 | 14.37 |

Numerical Embodiment 2

[Unit mm]

Surface data

| Surface number | r | d | nd | vd |
|---|---|---|---|---|
| 1 | 61.717 | 1.50 | 1.85478 | 24.8 |
| 2 | 31.451 | 6.89 | 1.49700 | 81.5 |
| 3 | 1480.510 | 0.15 | | |
| 4 | 33.545 | 3.97 | 1.83481 | 42.7 |
| 5 | 132.663 | (variable) | | |
| 6 | 92.439 | 0.90 | 1.91082 | 35.3 |
| 7 | 9.719 | 4.33 | | |
| 8 | 73.769 | 0.70 | 1.83481 | 42.7 |
| 9 | 29.961 | 2.13 | | |
| 10 | −31.016 | 0.65 | 1.77250 | 49.6 |
| 11 | 36.763 | 0.15 | | |
| 12 | 23.025 | 2.29 | 1.95906 | 17.5 |
| 13 | −276.989 | (variable) | | |
| 14(stop) | ∞ | (variable) | | |
| 15* | 10.750 | 4.60 | 1.69350 | 53.2 |
| 16 | 162.416 | 4.16 | | |
| 17 | 8.245 | 0.60 | 1.95906 | 17.5 |
| 18 | 5.459 | 3.74 | | |
| 19* | 12.432 | 3.42 | 1.49710 | 81.6 |
| 20* | −15.114 | (variable) | | |
| 21 | −36.382 | 0.50 | 1.95375 | 32.3 |
| 22 | 15.181 | (variable) | | |
| 23 | 21.280 | 2.12 | 2.00100 | 29.1 |
| 24 | −37.495 | 2.56 | | |
| 25 | ∞ | 1.72 | 1.51633 | 64.1 |
| 26 | ∞ | 2.00 | | |
| image plane | ∞ | | | |

Aspheric surface data

15th surface

K = −1.79983e+000
A4 = 1.15850e−004
A6 = −3.23593e−007
A8 = 2.93014e−009
A10 = −2.76487e−011

19th surface

K = 1.65429e+000
A4 = −3.56963e−004
A6 = −2.79414e−006
A8 = −2.66105e−007

20th surface

K = 0.00000e+000
A4 = −3.96599e−004
A6 = −4.34069e−006
A8 = −1.59031e−007
A10 = −2.63324e−009

Various data
Zoom ratio 21.92

| | Wide angle | Middle | Telephoto |
|---|---|---|---|
| Focal length | 5.39 | 43.23 | 118.16 |
| F-number | 1.65 | 3.30 | 3.71 |
| Half angle of view (deg) | 36.57 | 5.29 | 1.94 |
| Image height | 4.00 | 4.00 | 4.00 |
| Total lens length | 96.31 | 96.31 | 96.31 |
| BF | 5.70 | 5.70 | 5.70 |
| d5 | 0.60 | 25.30 | 31.47 |
| d13 | 31.67 | 6.97 | 0.80 |
| d14 | 9.65 | 2.73 | 0.60 |
| d20 | 3.57 | 7.03 | 2.07 |
| d22 | 2.29 | 5.76 | 12.85 |

[Unit mm]

Zoom lens unit data

| Unit | Start surface | Focal length |
|---|---|---|
| 1 | 1 | 48.10 |
| 2 | 6 | −9.53 |
| 3 | 14 | ∞ |
| 4 | 15 | 16.76 |
| 5 | 21 | −11.18 |
| 6 | 23 | 13.81 |

Numerical Embodiment 3

[Unit mm]

Surface data

| Surface number | r | d | nd | νd |
|---|---|---|---|---|
| 1 | 66.469 | 1.50 | 1.85478 | 24.8 |
| 2 | 31.563 | 6.91 | 1.49700 | 81.5 |
| 3 | −1654.341 | 0.15 | | |
| 4 | 33.328 | 4.31 | 1.83481 | 42.7 |
| 5 | 139.064 | (variable) | | |
| 6 | 89.405 | 0.90 | 1.83481 | 42.7 |
| 7 | 8.776 | 5.21 | | |
| 8 | −103.937 | 0.70 | 1.83481 | 42.7 |
| 9 | 89.280 | 1.25 | | |
| 10 | −29.816 | 0.65 | 1.77250 | 49.6 |
| 11 | 37.142 | 0.15 | | |
| 12 | 22.484 | 1.99 | 1.95906 | 17.5 |
| 13 | −20066.460 | (variable) | | |
| 14(stop) | ∞ | (variable) | | |
| 15* | 10.946 | 4.48 | 1.58313 | 59.4 |
| 16* | 112.417 | 5.32 | | |
| 17 | 11.308 | 0.60 | 1.85478 | 24.8 |
| 18 | 6.130 | 3.40 | 1.48749 | 70.2 |
| 19 | 10.769 | 2.34 | | |
| 20* | 7.228 | 2.35 | 1.49710 | 81.6 |
| 21* | 56.506 | (variable) | | |
| 22 | −74.314 | 0.50 | 1.83400 | 37.2 |
| 23 | 10.750 | (variable) | | |
| 24 | 14.881 | 2.72 | 1.64769 | 33.8 |
| 25 | −23.826 | 2.31 | | |
| 26 | ∞ | 1.72 | 1.51633 | 64.1 |
| 27 | ∞ | 2.00 | | |
| image plane | ∞ | | | |

Aspheric surface data

15th surface

K = −1.03703e+000
A4 = 4.08778e−005
A6 = −1.49380e−007
A8 = 3.24448e−009
A10 = −1.82767e−011

16th surface

K = 0.00000e+000
A4 = −1.67961e−005
A6 = 4.54430e−008

20th surface

K = −1.09911e+000
A4 = 1.41145e−004
A6 = 7.99012e−006
A8 = −3.88867e−007
A10 = 1.57087e−008

21th surface

K = 1.33690e+002

[Unit mm]

Various data
Zoom ratio 21.92

| | Wide angle | Middle | Telephoto |
|---|---|---|---|
| Focal length | 5.39 | 41.05 | 118.08 |
| F-number | 1.65 | 3.30 | 3.71 |
| Half angle of view (deg) | 36.59 | 5.57 | 1.94 |
| Image height | 4.00 | 4.00 | 4.00 |
| Total lens length | 96.12 | 96.12 | 96.12 |
| BF | 5.45 | 5.45 | 5.45 |
| d5 | 0.60 | 25.13 | 31.26 |
| d13 | 31.46 | 6.93 | 0.80 |
| d14 | 8.27 | 2.81 | 0.60 |
| d21 | 2.55 | 7.46 | 2.58 |
| d23 | 2.36 | 2.91 | 10.01 |

Zoom lens unit data

| Unit | Start surface | Focal length |
|---|---|---|
| 1 | 1 | 47.60 |
| 2 | 6 | −8.71 |
| 3 | 14 | ∞ |
| 4 | 15 | 16.32 |
| 5 | 22 | −11.23 |
| 6 | 24 | 14.54 |

Numerical Embodiment 4

[Unit mm]

Surface data

| Surface number | r | d | nd | νd |
|---|---|---|---|---|
| 1 | 62.287 | 1.50 | 1.85478 | 24.8 |
| 2 | 31.387 | 6.47 | 1.49700 | 81.5 |
| 3 | 2420.837 | 0.15 | | |
| 4 | 33.323 | 4.05 | 1.83481 | 42.7 |
| 5 | 133.479 | (variable) | | |
| 6 | 93.497 | 0.90 | 1.91082 | 35.3 |
| 7 | 9.721 | 4.15 | | |
| 8 | 68.486 | 0.70 | 1.83481 | 42.7 |
| 9 | 30.058 | 2.20 | | |
| 10 | −28.558 | 0.65 | 1.77250 | 49.6 |
| 11 | 40.568 | 0.15 | | |
| 12 | 24.011 | 2.25 | 1.95906 | 17.5 |
| 13 | −197.202 | (variable) | | |
| 14(stop) | ∞ | (variable) | | |
| 15* | 10.748 | 4.69 | 1.69350 | 53.2 |
| 16 | 208.118 | 4.12 | | |
| 17 | 8.327 | 0.60 | 1.95906 | 17.5 |
| 18 | 5.452 | 3.73 | | |
| 19* | 12.520 | 3.39 | 1.49710 | 81.6 |
| 20* | −15.578 | (variable) | | |
| 21 | −43.451 | 0.50 | 1.95375 | 32.3 |
| 22 | 14.780 | (variable) | | |
| 23 | 20.158 | 2.09 | 2.00100 | 29.1 |
| 24 | −41.776 | 2.64 | | |
| 25 | ∞ | 1.72 | 1.51633 | 64.1 |
| 26 | ∞ | 2.00 | | |
| image plane | ∞ | | | |

Aspheric surface data

15th surface

K = −1.81706e+000
A4 = 1.16204e−004
A6 = −3.41002e−007
A8 = 2.78569e−009
A10 = −2.52586e−011

-continued

[Unit mm]

19th surface

K = 1.71952e+000
A4 = −3.78650e−004
A6 = −2.30365e−006
A8 = −2.77238e−007

20th surface

K = 0.00000e+000
A4 = −4.27918e−004
A6 = −4.22893e−006
A8 = −1.44521e−007
A10 = −3.21495e−009

Various data
Zoom ratio 19.92

|  | Wide angle | Middle | Telephoto |
|---|---|---|---|
| Focal length | 5.59 | 41.49 | 111.32 |
| F-number | 1.65 | 3.30 | 3.71 |
| Half angle of view (deg) | 35.59 | 5.51 | 2.06 |
| Image height | 4.00 | 4.00 | 4.00 |
| Total lens length | 94.41 | 94.41 | 94.41 |
| BF | 5.77 | 5.77 | 5.77 |
| d5 | 0.60 | 24.86 | 30.92 |
| d13 | 31.12 | 6.86 | 0.80 |
| d14 | 8.71 | 2.77 | 0.60 |
| d20 | 3.64 | 7.20 | 2.13 |
| d22 | 2.29 | 4.66 | 11.91 |

Zoom lens unit data

| Unit | Start surface | Focal length |
|---|---|---|
| 1 | 1 | 47.61 |
| 2 | 6 | −9.62 |
| 3 | 14 | ∞ |
| 4 | 15 | 16.87 |
| 5 | 21 | −11.52 |
| 6 | 24 | 13.82 |

Numerical Embodiment 5

[Unit mm]

Surface data

| Surface number | r | d | nd | vd |
|---|---|---|---|---|
| 1 | 64.793 | 1.50 | 1.85478 | 24.8 |
| 2 | 32.157 | 7.07 | 1.49700 | 81.5 |
| 3 | 8505.273 | 0.15 | | |
| 4 | 34.163 | 4.35 | 1.83481 | 42.7 |
| 5 | 135.413 | (variable) | | |
| 6 | 75.847 | 0.90 | 1.91082 | 35.3 |
| 7 | 8.994 | 5.22 | | |
| 8 | −97.809 | 0.70 | 1.77250 | 49.6 |
| 9 | 66.752 | 1.46 | | |
| 10 | −28.734 | 0.65 | 1.77250 | 49.6 |
| 11 | 40.867 | 0.15 | | |
| 12 | 24.680 | 2.20 | 1.95906 | 17.5 |
| 13 | −138.158 | (variable) | | |
| 14(stop) | ∞ | (variable) | | |
| 15* | 11.179 | 5.44 | 1.69350 | 53.2 |
| 16* | 71.548 | 4.97 | | |
| 17 | 18.513 | 0.60 | 1.85478 | 24.8 |
| 18 | 6.163 | 3.10 | 1.48749 | 70.2 |
| 19 | 12.264 | 0.86 | | |
| 20* | 7.247 | 2.77 | 1.58313 | 59.4 |
| 21* | 274.136 | (variable) | | |
| 22 | −73.757 | 0.50 | 1.83481 | 42.7 |
| 23 | 11.592 | (variable) | | |

-continued

[Unit mm]

| 24 | 15.883 | 2.59 | 1.60342 | 38.0 |
|---|---|---|---|---|
| 25 | −22.174 | 3.16 | | |
| 26 | ∞ | 1.72 | 1.51400 | 70.0 |
| 27 | ∞ | 2.00 | | |
| image plane | ∞ | | | |

Aspheric surface data

15th surface

K = −1.00022e+000
A4 = 3.53051e−005
A6 = −1.56450e−008
A8 = 1.22554e−009
A10 = 2.84487e−012

16th surface

K = 0.00000e+000
A4 = −3.97087e−005
A6 = 3.01712e−007

20th surface

K = −1.01598e+000
A4 = −2.00732e−005
A6 = 5.16624e−006
A8 = −2.87861e−007
A10 = 7.18814e−009

21th surface

K = −4.93394e+003

Various data
Zoom ratio 21.92

|  | Wide angle | Middle | Telephoto |
|---|---|---|---|
| Focal length | 5.30 | 42.11 | 116.24 |
| F-number | 1.65 | 3.30 | 3.71 |
| Half angle of view (deg) | 37.02 | 5.43 | 1.97 |
| Image height | 4.00 | 4.00 | 4.00 |
| Total lens length | 97.27 | 97.27 | 97.27 |
| BF | 6.30 | 6.30 | 6.30 |
| d5 | 0.60 | 26.29 | 32.72 |
| d13 | 32.91 | 7.22 | 0.80 |
| d14 | 7.40 | 1.99 | 0.60 |
| d21 | 2.28 | 7.39 | 2.18 |
| d23 | 2.59 | 2.88 | 9.49 |

Zoom lens unit data

| Unit | Start surface | Focal length |
|---|---|---|
| 1 | 1 | 49.04 |
| 2 | 6 | −8.80 |
| 3 | 14 | ∞ |
| 4 | 15 | 16.06 |
| 5 | 22 | −11.97 |
| 6 | 24 | 15.74 |

Numerical Embodiment 6

[Unit mm]

Surface data

| Surface number | r | d | nd | vd |
|---|---|---|---|---|
| 1 | 65.554 | 1.50 | 1.85478 | 24.8 |
| 2 | 31.892 | 6.24 | 1.49700 | 81.5 |
| 3 | −1430.851 | 0.15 | | |
| 4 | 32.623 | 4.08 | 1.83481 | 42.7 |
| 5 | 125.937 | (variable) | | |
| 6 | 93.123 | 0.90 | 1.91082 | 35.3 |

-continued

[Unit mm]

| | | | | |
|---|---|---|---|---|
| 7 | 9.582 | 4.25 | | |
| 8 | 161.981 | 0.70 | 1.83481 | 42.7 |
| 9 | 40.045 | 2.02 | | |
| 10 | −25.529 | 0.65 | 1.77250 | 49.6 |
| 11 | 54.540 | 0.15 | | |
| 12 | 26.867 | 2.14 | 1.95906 | 17.5 |
| 13 | −115.524 | (variable) | | |
| 14(stop) | ∞ | (variable) | | |
| 15* | 10.995 | 4.65 | 1.69350 | 53.2 |
| 16 | −664.633 | 4.23 | | |
| 17 | 8.362 | 0.60 | 1.95906 | 17.5 |
| 18 | 5.390 | 3.47 | | |
| 19* | 12.333 | 3.30 | 1.49710 | 81.6 |
| 20* | −15.714 | (variable) | | |
| 21 | −62.746 | 0.50 | 1.95375 | 32.3 |
| 22 | 13.837 | (variable) | | |
| 23 | 20.647 | 1.89 | 2.00100 | 29.1 |
| 24 | −43.590 | 3.08 | | |
| 25 | ∞ | 1.72 | 1.51633 | 64.1 |
| 26 | ∞ | 2.00 | | |
| image plane | ∞ | | | |

Aspheric surface data

15th surface

K = −1.96028e+000
A4 = 1.12763e−004
A6 = −4.29822e−007
A8 = 2.31898e−009
A10 = −2.16112e−011

19th surface

K = 2.04090e+000
A4 = −4.06858e−004
A6 = −3.07141e−006
A8 = −2.94341e−007

20th surface

K = 0.00000e+000
A4 = −4.64468e−004
A6 = −5.34166e−006
A8 = −1.30014e−007
A10 = −4.26132e−009

Various data
Zoom ratio 15.93

| | Wide angle | Middle | Telephoto |
|---|---|---|---|
| Focal length | 5.82 | 37.58 | 92.67 |
| F-number | 1.65 | 3.30 | 3.71 |
| Half angle of view (deg) | 34.51 | 6.08 | 2.47 |
| Image height | 4.00 | 4.00 | 4.00 |
| Total lens length | 90.88 | 90.88 | 90.88 |
| BF | 6.21 | 6.21 | 6.21 |
| d5 | 0.60 | 23.98 | 29.83 |
| d13 | 30.03 | 6.65 | 0.80 |
| d14 | 7.05 | 2.49 | 0.60 |
| d20 | 3.20 | 6.92 | 2.87 |
| d22 | 2.37 | 3.21 | 9.15 |

Zoom lens unit data

| Unit | Start surface | Focal length |
|---|---|---|
| 1 | 1 | 46.98 |
| 2 | 6 | −9.67 |
| 3 | 14 | ∞ |
| 4 | 15 | 16.55 |
| 5 | 21 | −11.85 |
| 6 | 23 | 14.21 |

Numerical Embodiment 7

[Unit mm]

Surface data

| Surface number | r | d | nd | vd |
|---|---|---|---|---|
| 1 | 69.160 | 1.50 | 1.85478 | 24.8 |
| 2 | 32.965 | 7.50 | 1.49700 | 81.5 |
| 3 | −1305.133 | 0.15 | | |
| 4 | 34.455 | 4.46 | 1.83481 | 42.7 |
| 5 | 135.811 | (variable) | | |
| 6 | 89.237 | 0.90 | 1.83481 | 42.7 |
| 7 | 8.883 | 4.89 | | |
| 8 | 142.704 | 0.70 | 1.83481 | 42.7 |
| 9 | 38.570 | 1.78 | | |
| 10 | −27.066 | 0.65 | 1.77250 | 49.6 |
| 11 | 38.265 | 0.15 | | |
| 12 | 22.543 | 2.03 | 1.95906 | 17.5 |
| 13 | 47210.091 | (variable) | | |
| 14(stop) | ∞ | (variable) | | |
| 15* | 10.894 | 4.71 | 1.58313 | 59.4 |
| 16* | 207.513 | 4.82 | | |
| 17 | 11.190 | 0.60 | 1.85478 | 24.8 |
| 18 | 6.022 | 3.58 | 1.48749 | 70.2 |
| 19 | 9.804 | 2.58 | | |
| 20* | 7.319 | 1.95 | 1.49710 | 81.6 |
| 21* | 74.332 | (variable) | | |
| 22 | −67.779 | 0.50 | 1.83400 | 37.2 |
| 23 | 10.823 | (variable) | | |
| 24 | 15.858 | 2.69 | 1.64769 | 33.8 |
| 25 | −22.191 | 2.25 | | |
| 26 | ∞ | 1.72 | 1.51633 | 64.1 |
| 27 | ∞ | 2.00 | | |
| image plane | ∞ | | | |

Aspheric surface data

15th surface

K = −9.87665e−001
A4 = 3.94454e−005
A6 = −3.09449e−008
A8 = 2.03771e−009
A10 = −7.24252e−012

16th surface

K = 0.00000e+000
A4 = −3.09846e−006
A6 = 6.81675e−008

20th surface

K = −9.40770e−001
A4 = 9.88095e−005
A6 = 7.56724e−006
A8 = −4.15844e−007
A10 = 1.76028e−008

21th surface

K = 2.40133e+002

Various data
Zoom ratio 24.92

| | Wide angle | Middle | Telephoto |
|---|---|---|---|
| Focal length | 5.18 | 41.90 | 128.96 |
| F-number | 1.65 | 3.30 | 3.71 |
| Half angle of view (deg) | 37.70 | 5.45 | 1.78 |
| Image height | 4.00 | 4.00 | 4.00 |
| Total lens length | 99.12 | 99.12 | 99.12 |
| BF | 5.38 | 5.38 | 5.38 |
| d5 | 0.60 | 26.66 | 33.18 |
| d13 | 33.38 | 7.32 | 0.80 |
| d14 | 8.79 | 3.03 | 0.60 |
| d21 | 2.45 | 7.52 | 2.45 |
| d23 | 2.39 | 3.08 | 10.58 |

-continued

[Unit mm]

Zoom lens unit data

| Unit | Start surface | Focal length |
|------|---------------|--------------|
| 1 | 1 | 49.69 |
| 2 | 6 | −8.72 |
| 3 | 14 | ∞ |
| 4 | 15 | 16.41 |
| 5 | 22 | −11.16 |
| 6 | 24 | 14.69 |

TABLE 1

| Conditional expression | Numerical embodiment | | | | | | |
|---|---|---|---|---|---|---|---|
| | 1 | 2 | 3 | 4 | 5 | 6 | 7 |
| (1) | −1.42 | −1.50 | −1.45 | −1.47 | −1.34 | −1.40 | −1.47 |
| (2) | 3.25 | 3.41 | 3.99 | 3.74 | 4.72 | 4.53 | 3.98 |
| (3) | 2.86 | 2.87 | 2.92 | 2.82 | 3.05 | 2.84 | 3.03 |
| (4) | 4.07 | 4.30 | 4.24 | 4.13 | 4.10 | 3.97 | 4.45 |
| (5) | 8.90 | 8.92 | 8.84 | 8.52 | 9.25 | 8.08 | 9.60 |
| (6) | 3.11 | 3.11 | 3.03 | 3.02 | 3.03 | 2.85 | 3.17 |
| (7) | 2.19 | 2.07 | 2.08 | 2.06 | 2.26 | 2.04 | 2.16 |
| (8) | 1.14 | 1.17 | 1.00 | 1.19 | 1.01 | 1.05 | 1.00 |
| (9) | 1.47 | 1.38 | 1.56 | 1.32 | 1.44 | 1.39 | 1.62 |
| (10) | −1.76 | −1.76 | −1.87 | −1.75 | −1.82 | −1.71 | −1.88 |
| (11) | 1.16 | 1.21 | 1.12 | 1.22 | 1.02 | 1.17 | 1.12 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-010458, filed Jan. 25, 2018, which is hereby incorporated by reference herein in its entirety.

What is claimed is:

1. A zoom lens comprising in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
during zooming from a wide angle end to a telephoto end, intervals between the adjacent lens units are changed in such a way that the second lens unit is configured to move from the object side to the image side and the third lens unit and the fourth lens unit are configured to move, and
following conditional expressions are satisfied:

$-1.52 \le f3/f4 \le -1.33$;

$3.0 \le |M2/M3| \le 6.0$; and $3.9 \le |f1/f4| \le 5.0$, where f3 represents a focal length of the third lens unit, f4 represents a focal length of the fourth lens unit, M2 represents a movement amount of the second lens unit during zooming from the wide angle end to the telephoto end, M3 represents a movement amount of the third lens unit during zooming from the wide angle end to the telephoto end, and f1 represents a focal length of the first lens unit.

2. The zoom lens according to claim 1, wherein the first lens unit is not configured to move for zooming.

3. The zoom lens according to claim 1, wherein the fifth lens unit is not configured to move for zooming.

4. The zoom lens according to claim 1, wherein an aperture stop is arranged between the second lens unit and the third lens unit, and the aperture stop is not configured to move for zooming.

5. The zoom lens according to claim 1, wherein the first lens unit consists of a negative lens, a positive lens, and a positive lens arranged in the order from the object side to the image side.

6. The zoom lens according to claim 1, wherein the fourth lens unit consists of a single negative lens.

7. The zoom lens according to claim 1, wherein the fourth lens unit consists of a positive lens and a negative lens cemented together.

8. The zoom lens according to claim 1, wherein the fifth lens unit consists of a single positive lens.

9. The zoom lens according to claim 1, wherein the fifth lens unit consists of a positive lens and a negative lens cemented together.

10. The zoom lens according to claim 1, wherein a following conditional expression is satisfied:

$2.0 \le f1/f3 \le 4.0$, where f1 represents a focal length of the first lens unit.

11. The zoom lens according to claim 1, wherein a following conditional expression is satisfied:

$6.0 \le f1/fw \le 12.0$, where fw represents a focal length of the zoom lens at the wide angle end.

12. The zoom lens according to claim 1, wherein a following conditional expression is satisfied:

$2.0 \le f3/fw \le 4.0$, where fw represents a focal length of the zoom lens at the wide angle end.

13. The zoom lens according to claim 1, wherein a following conditional expression is satisfied:

$1.0 \le |f4/fw| \le 3.0$, where fw represents a focal length of the zoom lens at the wide angle end.

14. The zoom lens according to claim 1, wherein a following conditional expression is satisfied:

$0.2 \le |M4/M3| \le 2.0$, where

M4 represents a movement amount of the fourth lens unit during zooming from the wide angle end to the telephoto end.

15. The zoom lens according to claim 1, wherein a following conditional expression is satisfied:

$1.1 \le |(\beta 3T \times \beta 4T)/(\beta 3W \times \beta 4W)| \le 2.0$, where β3W represents lateral magnification of the third lens unit at the wide angle end, β3T represents lateral magnification of the third lens unit at the telephoto end, β4W represents lateral magnification of the fourth lens unit at the wide angle end, and β4T represents lateral magnification of the fourth lens unit at the telephoto end.

16. The zoom lens according to claim 1, wherein a following conditional expression is satisfied:

$-2.5 \le f3/f2 \le -1.0$, where f2 represents a focal length of the second lens unit.

17. The zoom lens according to claim 1, wherein a following conditional expression is satisfied:

0.5≤f3/f5≤2.0, where f5 represents a focal length of the fifth lens unit.

18. The zoom lens according to claim 1, wherein during zooming from the wide angle end to the telephoto end, the third lens unit is configured to move to the object side, and the fourth lens unit is configured to move to the object side.

19. An image pickup apparatus comprising:
a zoom lens comprising, in order from an object side to an image side:
  a first lens unit having a positive refractive power;
  a second lens unit having a negative refractive power;
  a third lens unit having a positive refractive power;
  a fourth lens unit having a negative refractive power; and
  a fifth lens unit having a positive refractive power, wherein
during zooming from a wide angle end to a telephoto end, intervals between the adjacent lens units are changed in such a way that the second lens unit is configured to move from the object side to the image side and the third lens unit and the fourth lens unit are configured to move, and following conditional expressions are satisfied:

−1.52≤f3/f4≤−1.33;

3.0≤|M2/M3|≤6.0; and 3.9≤|f1/f4|≤5.0, where f3 represents a focal length of the third lens unit, f4 represents a focal length of the fourth lens unit, M2 represents a movement amount of the second lens unit during zooming from the wide angle end to the telephoto end, M3 represents a movement amount of the third lens unit during zooming from the wide angle end to the telephoto end, and f1 represents a focal length of the first lens unit; and an image pickup element configured to receive an image formed by the zoom lens.

20. An image pickup system comprising:
a zoom lens comprising in order from an object side to an image side:
  a first lens unit having a positive refractive power;
  a second lens unit having a negative refractive power;
  a third lens unit having a positive refractive power;
  a fourth lens unit having a negative refractive power; and
  a fifth lens unit having a positive refractive power, wherein
during zooming from a wide angle end to a telephoto end, intervals between the adjacent lens units are changed in such a way that the second lens unit is configured to move from the object side to the image side and the third lens unit and the fourth lens unit are configured to move, and following conditional expressions are satisfied:

−1.52≤f3/f4≤−1.33;

3.0≤|M2/M3|≤6.0; and 3.9≤|f1/f4|≤5.0, where f3 represents a focal length of the third lens unit, f4 represents a focal length of the fourth lens unit, M2 represents a movement amount of the second lens unit during zooming from the wide angle end to the telephoto end, M3 represents a movement amount of the third lens unit during zooming from the wide angle end to the telephoto end, and f1 represents a focal length of the first lens unit; and a control unit configured to control the zoom lens during zooming.

* * * * *